(12) United States Patent
Ohno et al.

(10) Patent No.: US 10,286,970 B2
(45) Date of Patent: May 14, 2019

(54) VEHICLE

(71) Applicant: YAMAHA HATSUDOKI KABUSHIKI KAISHA, Iwata-shi, Shizuoka (JP)

(72) Inventors: Kohsuke Ohno, Shizuoka (JP); Kazuhisa Takano, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 15/279,767

(22) Filed: Sep. 29, 2016

(65) Prior Publication Data

US 2017/0088221 A1    Mar. 30, 2017

(30) Foreign Application Priority Data

Sep. 30, 2015  (JP) ................. 2015-194212
Jun. 24, 2016  (JP) ................. 2016-125511

(51) Int. Cl.
| | |
|---|---|
| *B62K 5/10* | (2013.01) |
| *B60G 13/00* | (2006.01) |
| *B62K 5/05* | (2013.01) |
| *B62K 5/08* | (2006.01) |
| *B62K 25/08* | (2006.01) |
| *B62K 5/027* | (2013.01) |
| *B62K 5/00* | (2013.01) |

(52) U.S. Cl.
CPC ............. *B62K 5/10* (2013.01); *B60G 13/005* (2013.01); *B62K 5/027* (2013.01); *B62K 5/05* (2013.01); *B62K 5/08* (2013.01); *B62K 25/08* (2013.01); *B62K 2005/001* (2013.01)

(58) Field of Classification Search
CPC .......... B62K 5/10; B62K 5/027; B62K 25/08; B62K 5/08; B62K 5/05; B62K 2005/001; B60G 13/005
See application file for complete search history.

(56) References Cited

U.S. PATENT DOCUMENTS

| | | | | |
|---|---|---|---|---|
| 4,351,410 | A | * | 9/1982 | Townsend ................ B62D 9/02 180/210 |
| 5,829,773 | A | * | 11/1998 | Rajaee ................ B60G 13/008 280/276 |
| 6,109,635 | A | | 8/2000 | Maeda et al. |

(Continued)

FOREIGN PATENT DOCUMENTS

| | | |
|---|---|---|
| CN | 2354858 Y | 12/1999 |
| EP | 1 571 016 A1 | 9/2005 |

(Continued)

*Primary Examiner* — Darlene P Condra
(74) *Attorney, Agent, or Firm* — Keating and Bennett, LLP

(57) ABSTRACT

In a vehicle, a left shock absorber is provided with a left front outer tube, a left rear outer tube, a left front inner tube, a left rear inner tube and a left connector. The left front outer tube and the left rear outer tube are supported on a left bracket. The left front inner tube is connected to the left front outer tube so as to be slidable in an interior of the left front outer tube along a left telescopic axis. The left rear inner tube is connected to the left rear outer tube so as to be slidable in an interior of the left rear outer tube along the left telescopic axis. The left connector connects the left front outer tube and the left rear outer tube.

11 Claims, 14 Drawing Sheets

(56) References Cited

U.S. PATENT DOCUMENTS

| | | | | |
|---|---|---|---|---|
| 6,244,609 B1* | 6/2001 | Wilson | | B62K 25/08 188/312 |
| 6,260,870 B1* | 7/2001 | Fan | | B62K 21/20 280/276 |
| 6,412,803 B1* | 7/2002 | Lalikyan | | B62K 25/02 280/276 |
| 6,520,524 B1* | 2/2003 | Costa | | B60G 17/0416 280/276 |
| 6,893,037 B1* | 5/2005 | Galasso | | B62K 25/08 280/276 |
| 8,262,111 B2* | 9/2012 | Lucas | | B60G 3/20 180/210 |
| 8,814,186 B1* | 8/2014 | Rinda | | B62K 5/06 280/124.135 |
| 9,725,130 B2* | 8/2017 | Takano | | B62K 25/08 |
| 2005/0023795 A1* | 2/2005 | Czysz | | B62K 21/02 280/276 |
| 2005/0156401 A1* | 7/2005 | Terblanche | | B62K 25/08 280/276 |
| 2005/0167174 A1 | 8/2005 | Marcacci | | |
| 2005/0212251 A1* | 9/2005 | Czysz | | B62K 21/02 280/276 |
| 2006/0279059 A1* | 12/2006 | Czysz | | B62K 21/02 280/276 |
| 2008/0115994 A1* | 5/2008 | Martini | | B62D 9/02 180/210 |
| 2010/0123297 A1* | 5/2010 | Dal Soggio | | B62K 25/08 280/276 |
| 2010/0263972 A1* | 10/2010 | Mardollo | | B62K 25/08 188/283 |
| 2011/0221108 A1* | 9/2011 | Uchiyama | | B62K 25/08 267/217 |
| 2012/0119453 A1* | 5/2012 | Mercier | | B62D 9/02 280/5.51 |
| 2012/0235378 A1* | 9/2012 | Wagner | | B62K 21/00 280/279 |
| 2014/0145413 A1* | 5/2014 | Baltaxe | | B62K 21/02 280/279 |
| 2014/0353940 A1 | 12/2014 | Bartolozzi et al. | | |
| 2015/0210338 A1 | 7/2015 | Iizuka et al. | | |
| 2015/0232147 A1 | 8/2015 | Hirayama et al. | | |
| 2015/0239522 A1 | 8/2015 | Iizuka et al. | | |
| 2015/0246704 A1 | 9/2015 | Takano et al. | | |
| 2015/0251719 A1 | 9/2015 | Takano et al. | | |
| 2015/0259027 A1 | 9/2015 | Takano et al. | | |
| 2015/0291241 A1 | 10/2015 | Takano et al. | | |
| 2015/0298735 A1 | 10/2015 | Takano et al. | | |
| 2015/0307149 A1 | 10/2015 | Iizuka et al. | | |
| 2015/0344097 A1 | 12/2015 | Iizuka et al. | | |
| 2016/0121958 A1 | 5/2016 | Asano | | |
| 2016/0137252 A1 | 5/2016 | Hirayama | | |
| 2016/0137253 A1 | 5/2016 | Hirayama | | |
| 2016/0152293 A1 | 6/2016 | Hirayama | | |

FOREIGN PATENT DOCUMENTS

| | | |
|---|---|---|
| EP | 2 738 076 A1 | 6/2014 |
| EP | 2 913 257 A1 | 9/2015 |
| EP | 2 995 543 A1 | 3/2016 |
| JP | 61-111890 U | 7/1986 |
| JP | 63-180579 A | 7/1988 |
| JP | 11-198887 A | 7/1999 |
| JP | 2005-313876 A | 11/2005 |
| JP | 2013-023124 A | 2/2013 |
| WO | 2014/065396 A1 | 5/2014 |
| WO | 2014/181736 A1 | 11/2014 |
| WO | 2015/002166 A1 | 1/2015 |

* cited by examiner

VEHICLE

BACKGROUND OF THE INVENTION

1. Field of the Present Invention

The present invention relates to a vehicle equipped with a leanable body frame and two front wheels.

2. Description of the Related Art

A vehicle described in, for example, International Patent Publication No. 2014/065396 includes a body frame that leans to the left or right of the vehicle when the vehicle is cornering and two front wheels that are arranged side by side in a left-right direction of the body frame.

The vehicle includes a linkage. The linkage includes an upper cross member, a lower cross member, a left side member and a right side member. The upper cross member, the lower cross member, the left side member and the right side member are connected so that the upper cross member and the lower cross member maintain postures that are parallel to each other and the left side member and the right side member maintain postures that are parallel to each other.

The vehicle includes a left shock absorber and a right shock absorber. The left shock absorber is a telescopic shock absorber that supports the left front wheel and which attenuates or absorbs a displacement of the left front wheel relative to the linkage in an up-down direction of the body frame. The right shock absorber is a telescopic shock absorber that supports the right front wheel and which attenuates or absorbs a displacement of the right front wheel relative to the linkage in the up-down direction of the body frame.

The vehicle includes a left bracket, a right bracket, a steering member and a steering force transmission. The left bracket is turnably connected to the left side member. The right bracket is turnably connected to the right side member. The steering member is connected to the body frame so as to be able to turn about a steering axis. The steering force transmission turns the left bracket and the right bracket in turning directions of the steering member.

The telescopic left shock absorber includes a left front outer tube, a left rear outer tube, a left front inner tube, a left rear inner tube and a left axle. The left rear outer tube is disposed directly behind the left front inner tube. The left front inner tube is smaller in diameter than the left front outer tube and is slidably connected to the left front outer tube. The left rear inner tube is smaller in diameter than the left rear outer tube and is slidably connected to the left rear outer tube. An upper end of the left front inner tube and an upper end of the left rear inner tube are supported on the left bracket. One end of the left axle is supported by the left front outer tube and the left rear outer tube. The left front wheel is supported by a left axle.

The telescopic right shock absorber includes a right front outer tube, a right rear outer tube, a right front inner tube, a right rear inner tube and a right axle. The right rear outer tube is disposed directly behind the right front inner tube. The right front inner tube is smaller in diameter than the right front outer tube and is slidably connected to the right front outer tube. The right rear inner tube is smaller in diameter than the right rear outer tube and is slidably connected to the right rear outer tube. An upper end of the right front inner tube and an upper end of the right rear inner tube are supported on the right bracket. One end of the right axle is supported by the right front outer tube and the right rear outer tube. The right front wheel is supported by a right axle.

Consequently, a turning operation of the steering member is transmitted to the left front wheel and the right front wheel by way of the steering force transmission, the left bracket, the right bracket, the left shock absorber and the right shock absorber. Front ends of the left front wheel and the right front wheel are oriented in directions corresponding to the turning directions of the steering member, such that the left front wheel and the right front wheel are turned accordingly.

For example, in a case where a drive source having a great output is mounted on a vehicle, since the available running speed is increased, a greater load is applied to individual shock absorbers. Consequently, it is required to increase the rigidity of each of the shock absorbers in order to obtain a desired driving performance. In order to increase the rigidity, it has been considered to increase diameters of outer tubes and inner tubes. However, as this occurs, the shock absorbers are enlarged in size, such that the vehicle is inevitably enlarged in size.

SUMMARY OF THE PRESENT INVENTION

In view of the above, there is a goal to obtain a desired driving characteristic while significantly reducing or preventing the enlargement in size of a vehicle that includes a leanable body frame and two front wheels.

In the case of the vehicle including the two front wheels as described above, it is possible to impart a characterized driving performance (in particular, a behavior from a straight driving state to an initial stage of steering) to the vehicle by setting the toe angle and the camber angle as required for both the front wheels.

The inventors of preferred embodiments of the present invention considered enhancing the overall rigidity of the left shock absorber by using a configuration in which the left front outer tube having a greater diameter than that of the left front inner tube and the left rear outer tube having a greater diameter than that of the left rear inner tube are supported by the left bracket. Likewise, the inventors considered enhancing the overall rigidity of the right shock absorber by using a configuration in which the right front outer tube having a greater diameter than that of the right front inner tube and the right rear outer tube having a greater diameter than that of the right rear inner tube are supported by the right bracket.

However, as a result of using the configurations described above, the inventors confronted a situation in which the toe angle and the camber angle deviated from the initially set values such that the desired driving performance could not be obtained. As a result of studying the cause for the situation described above, the following facts were discovered by the inventors: (i) a twist is caused between the front outer tube and the front inner tube and between the rear outer tube and the rear inner tube due to the fact that the predetermined caster angles are set individually for the shock absorbers; (ii) each of the supporting structure of the left front wheel by the left axle and the supporting structure of the right front wheel by the right axle is of a cantilever type; and (iii) the twist causes the toe angle and the camber angle to deviate from the initially set values.

Accordingly, the inventors discovered that connecting the left front outer tube and the left rear outer tube together by the left connector further enhances the rigidity of the left shock absorber and prevents twist that is caused by a load applied to the left front wheel from the road surface, thus making it possible to prevent the influence of twist on the toe angle and the camper angle that are set for the left front wheel. Likewise, the inventors discovered that connecting the right front outer tube and the right rear outer tube together by the right connector further enhances the rigidity of the right shock absorber and prevents twist that is caused by the load applied to the right front wheel from the road surface, thus making it possible to prevent the influence of twist on the toe angle and the camper angle that are set for the right front wheel.

According to a preferred embodiment of the present invention, a vehicle includes a body frame; a left front wheel and a right front wheel that are arranged side by side in a left-right direction of the body frame; and a linkage disposed above the left front wheel and the right front wheel in an up-down direction of the body frame, and that changes positions of the left front wheel and the right front wheel relative to the body frame to cause the body frame to lean to left or right of the vehicle, wherein the linkage includes an upper cross member, a lower cross member, a left side member and a right side member; the upper cross member, the lower cross member, the left side member and the right side member are connected such that the upper cross member and the lower cross member maintain postures that are parallel to each other, and such that the left side member and the right side member maintain postures that are parallel to each other; the vehicle further includes a left shock absorber supporting the left front wheel and that attenuates or absorbs displacement of the left front wheel relative to the linkage in an up-down direction of the body frame; a right shock absorber supporting the right front wheel and that attenuates or absorbs displacement of the right front wheel relative to the linkage in the up-down direction of the body frame; a left bracket turnably connected to the left side member; a right bracket turnably connected to the right side member; a steering member connected to the body frame so as to be able to turn about a steering axis; and a steering force transmission that turns the left bracket and the right bracket in a direction that the steering member is turned; the left shock absorber includes a left front outer tube supported on the left bracket; a left rear outer tube supported on the left bracket at a position directly behind the left front outer tube in a front-rear direction of the body frame; a left front inner tube connected to the left front outer tube so as to be slidable in an interior of the left front outer tube along a left telescopic axis; a left rear inner tube connected to the left rear outer tube at a position directly behind the left front inner tube so as to be slidable in an interior of the left rear outer tube along the left telescopic axis; a left axle including a first end supported by the left front inner tube and the left rear inner tube, and a second end supporting the left front wheel; and a left connector connecting the left front outer tube and the left rear outer tube; and the right shock absorber includes a right front outer tube supported on the right bracket; a right rear outer tube supported on the right bracket at a position directly behind the right front outer tube in the front-rear direction of the body frame; a right front inner tube connected to the right front outer tube so as to be slidable in an interior of the right front outer tube along a right telescopic axis; a right rear inner tube connected to the right rear outer tube at a position directly behind the right front inner tube so as to be slidable in an interior of the right rear outer tube along the right telescopic axis; a right axle including a first end supported by the right front inner tube and the right rear inner tube, and a second end supporting the right front wheel; and a right connector connecting the right front outer tube and the right rear outer tube.

According to the configuration described above, the overall rigidity of the left shock absorber is enhanced as well as the twist caused by the load applied to the left front wheel from the road surface is prevented, thus making it possible to prevent the influence of twist on the toe angle and the camper angle that are set for the left front wheel. On the other hand, the necessity of increasing the diameters of the left front outer tube, the left front inner tube, the left rear outer tube and the left rear inner tube in order to enhance the rigidity is obviated, thus making it possible to prevent the enlargement in size of the left shock absorber.

Likewise, the overall rigidity of the right shock absorber is enhanced as well as the twist caused by the load applied to the right front wheel from the road surface is prevented, thus making it possible to prevent the influence of twist on the toe angle and the camper angle that are set for the right front wheel. On the other hand, the necessity of increasing the diameters of the right front outer tube, the right front inner tube, the right rear outer tube and the right rear inner tube in order to enhance the rigidity is obviated, thus making it possible to prevent the enlargement in size of the right shock absorber.

As a result, it is possible to obtain a desired driving performance while preventing the enlargement in size of the vehicle that includes the leanable body frame and the two front wheels.

The above vehicle may be configured as follows. The left bracket supports a left front upper end of the left front outer tube and a left rear upper end of the left rear outer tube. The left connector connects a portion that is located closer to a left front lower end of the left front outer tube than a left front midpoint that is located halfway between a left front upper end and the left front lower end of the left front outer tube with a portion that is located closer to a left rear lower end of the left rear outer tube than a left rear midpoint that is located halfway between a left rear upper end and the left rear lower end of the left rear outer tube. The right bracket supports a right front upper end of the right front outer tube and a right rear upper end of the right rear outer tube. The right connector connects a portion that is located closer to a right front lower end of the right front outer tube than a right front midpoint that is located halfway between a right front upper end and the right front lower end of the right front outer tube with a portion that is located closer to a right rear lower end of the right rear outer tube than a right rear midpoint that is located halfway between a right rear upper end and the right rear lower end of the right rear outer tube.

Namely, the left connector connects together the positions that are located closer to the lower end of the left front outer tube and the lower end of the left rear outer tube than the upper end of the left front outer tube and the upper end of the left rear outer tube that are supported by the left bracket. The rigidity against twist is enhanced by arranging the left connector to be spaced as far as possible away from the supporting position by the bracket. Consequently, it is possible to further prevent the influence applied by the load to the left front wheel from the road surface on the toe angles and the camper angles set for the left front wheel and the right front wheel.

Likewise, the right connector connects together the positions that are located closer to the lower end of the right front outer tube and the lower end of the right rear outer tube than the upper end of the right front outer tube and the upper end of the right rear outer tube that are supported by the right bracket. The rigidity against twist is enhanced by arranging the right connector to be spaced as far as possible away from the supporting position by the bracket. Consequently, it is possible to further prevent the influence applied by the load to the right front wheel from the road surface on the toe angles and the camber angles set for the left front wheel and the right front wheel.

As a result, it is possible to improve the maintainability of the desired driving performance while preventing the enlargement in size of the vehicle that includes the leanable body frame and the two front wheels.

The above vehicle may be configured as follows. The left bracket supports a left front upper end of the left front outer tube and a left rear upper end of the left rear outer tube. The left connector overlaps the left front wheel as viewed from the left-right direction of the body frame at least when a lower end of the left rear outer tube approaches the left axle most closely. The right bracket supports a right front upper end of the right front outer tube and a right rear upper end of the right rear outer tube. The right connector overlaps the right front wheel as viewed from the left-right direction of the body frame at least when a lower end of the right rear outer tube approaches the right axle most closely.

By setting the positional relationship between the left connector and the left front wheel in the way described above, the left connector is disposed in a position that is spaced away enough from the supporting position by the left bracket. This enhances the rigidity against twist. Consequently, it is possible to further prevent the influence applied by the load to the left front wheel from the road surface on the toe angle and the camber angle set for the left front wheel.

By setting the positional relationship between the right connector and the right front wheel in the way described above, the right connector is disposed in a position that is spaced away enough from the supporting position by the right bracket. This enhances the rigidity against twist. Consequently, it is possible to further prevent the influence by the load applied to the right front wheel from the road surface on the toe angle and the camber angle set for the right front wheel.

As a result, it is possible to improve the maintainability of the desired driving performance while preventing the enlargement in size of the vehicle that includes the leanable body frame and the two front wheels.

Preferably, the above vehicle may be configured as follows. The left connector overlaps the left front wheel as viewed from the left-right direction of the body frame, and the right connector overlaps the right front wheel as viewed from the left-right direction of the body frame, when the body frame is in an upright state while the left front wheel and the right front wheel are not turned by the steering member.

By using the configuration in which the above-described positional relationship between the left connector and the left front wheel is established also in such a state that the body frame is in the upright state while the left front wheel and the right front wheel are not turned at all by the steering member, in addition to the advantageous effect described above, the rigidity against twist is further increased. Consequently, it is possible to further prevent the influence by the load applied to the left front wheel from the road surface on the toe angle and the camber angle set for the left front wheel.

By using the configuration in which the positional relationship between the right connector and the right front wheel is established also in such a state that the body frame is in the upright state while the left front wheel and the right front wheel are not turned at all by the steering member, in addition to the advantageous effect described above, the rigidity against twist is further increased. Consequently, it is possible to further prevent the influence by the load applied to the right front wheel from the road surface on the toe angle and the camber angle set for the right front wheel.

As a result, it is possible to further improve the maintainability of the desired driving performance while preventing the enlargement in size of the vehicle that includes the leanable body frame and the two front wheels.

The above vehicle may be configured as follows. A dimension along the left telescopic axis of a portion of the left rear outer tube that is located above the left front wheel as viewed from the left-right direction of the body frame is greater than a dimension along the left telescopic axis of a portion of the left rear outer tube that overlaps the left front wheel as viewed from the left-right direction of the body frame, when the body frame is in an upright state while the left front wheel and the right front wheel are not turned by the steering member. An upper end of the left rear inner tube is positioned above the left connector in the up-down direction of the body frame. A dimension along the right telescopic axis of a portion of the right rear outer tube that is located above the right front wheel as viewed from the left-right direction of the body frame is greater than a dimension along the right telescopic axis of a portion of the right rear outer tube that overlaps the right front wheel as viewed from the left-right direction of the body frame when the body frame is in the upright state while the left front wheel and the right front wheel are not turned by the steering member. An upper end of the right rear inner tube is positioned above the right connector in the up-down direction of the body frame.

By setting the positional relationship between the left rear outer tube and the left front wheel in the way described above, a sufficient sliding length (stroke) for the left rear inner tube is easily ensured. On the other hand, by setting the positional relationship between the upper end of the left rear inner tube and the left connector in the way described above, a sufficient fitting length of the left rear inner tube in the left rear outer tube is easily ensured. Consequently, it is easy to ensure the shock absorbing performance and the rigidity of the left shock absorber.

By setting the positional relationship between the right rear outer tube and the right front wheel in the way described above, a sufficient sliding length (stroke) for the right rear inner tube is easily ensured. On the other hand, by setting the positional relationship between the upper end of the right rear inner tube and the right connector in the way described above, a sufficient fitting length of the right rear inner tube in the right rear outer tube is easily ensured. Consequently, it is easy to ensure the shock absorbing performance and the rigidity of the right shock absorber.

As a result, it is possible to improve the maintainability of the desired driving performance while preventing the enlargement in size of the vehicle that includes the leanable body frame and the two front wheels.

The above vehicle may be configured as follows. The left connector holds an outer circumferential surface of the left rear outer tube. A dimension along the left telescopic axis of a portion of the left rear outer tube that is held by the left connector is smaller than a dimension along the left telescopic axis of a portion of the left rear outer tube that is supported by the left bracket. The right connector holds an outer circumferential surface of the right rear outer tube. A dimension along the right telescopic axis of a portion of the right rear outer tube that is held by the right connector is smaller than a dimension along the right telescopic axis of a portion of the right rear outer tube that is supported by the right bracket.

By setting the dimension of the left connector along the left telescopic axis in the way described above, it becomes easy to avoid interference of the left connector with its peripheral members when the left rear outer tube slides while ensuring the function to improve the rigidity of the left shock absorber as a result of the left connector being provided. Consequently, it is possible to prevent the enlargement in size of the peripheral structure of the left shock absorber that would otherwise occur in order to avoid the interference described above.

By setting the dimension of the right connector along the right telescopic axis in the way described above, it becomes easy to avoid interference of the right connector with its peripheral members when the right rear outer tube slides while ensuring the function to improve the rigidity of the right shock absorber as a result of the right connector being provided. Consequently, it is possible to prevent the enlargement in size of the peripheral structure of the right shock absorber that would otherwise occur in order to avoid the interference described above.

As a result, it is possible to improve the maintainability of the desired driving performance while preventing the enlargement in size of the vehicle that includes the leanable body frame and the two front wheels.

The above vehicle may be configured as follows. The left connector includes a left front connector holding the left front outer tube, and a left rear connector holding the left rear outer tube. The left front connector includes a left front slit extending along the left telescopic axis. The left rear connector includes a left rear slit extending along the left telescopic axis. The right connector includes a right front connector holding the right front outer tube, and a right rear connector holding the right rear outer tube. The right front connector includes a right front slit extending along the right telescopic axis. The right rear connector includes a right rear slit extending along the right telescopic axis.

According to this configuration, since the left front outer tube is held with a so-called split fastening structure, stress exerted on the left front outer tube as a result of being held by the left front connector is easily dispersed. Likewise, since the left rear outer tube is held with the so-called split fastening structure stress exerted on the left rear outer tube as a result of being held by the left rear connector is easily dispersed. Further, it is possible to reduce the number of parts to obtain these advantageous effects.

On the other hand, since the right front outer tube is held with the so-called split fastening structure, stress exerted on the right front outer tube as a result of being held by the right front connector is easily dispersed. Likewise, stress exerted on the right rear outer tube as a result of being held by the right rear connector is easily dispersed. Further, it is possible to reduce the number of parts to obtain these advantageous effects.

As a result, it is possible to further improve the maintainability of the desired driving performance at low costs while preventing the enlargement in size of the vehicle that includes the leanable body frame and the two front wheels.

In this case, the above vehicle may be configured as follows. The left front slit and the left rear slit extend parallel to each other. The right front slit and the right rear slit extend parallel to each other.

According to this configuration, the left front slit and the left rear slit are easily machined in the left connector. Likewise, the right front slit and the right rear slit are easily machined in the right connector.

As a result, it is possible to realize an improvement in maintainability of the desired driving performance at low costs while preventing the enlargement in size of the vehicle that includes the leanable body frame and the two front wheels.

The above vehicle may be configured as follows. The left front slit and the left rear slit extend in the front-rear direction of the body frame. The right front slit and the right rear slit extend in the front-rear direction of the body frame.

According to this configuration, the fastening member that fastens the left front outer tube is disposed directly ahead of the left front outer tube in the front-rear direction of the body frame. Likewise, the fastening member that fastens the left rear outer tube is disposed directly behind the left rear outer tube in the front-rear direction of the body frame. Consequently, it is possible to prevent the enlargement in size of the left shock absorber in the left-right direction of the body frame.

Likewise, the fastening member that fastens the right front outer tube is disposed directly ahead of the right front outer tube in the front-rear direction of the body frame. Likewise, the fastening member that fastens the right rear outer tube is disposed directly behind the right rear outer tube in the front-rear direction of the body frame. Consequently, it is possible to prevent the enlargement in size of the right shock absorber in the left-right direction of the body frame.

As a result, it is possible to improve the maintainability of the desired driving performance while preventing the enlargement in size of the vehicle that includes the leanable body frame and the two front wheels.

In this case, the vehicle may be configured as follows. The left front slit at least partially overlaps the left rear slit as viewed from the front-rear direction of the body frame. The right front slit at least partially overlaps the right rear slit as viewed from the front-rear direction of the body frame.

According to this configuration, the left front slit and the left rear slit are easily machined in the left connector. Likewise, the right front slit and the right rear slit are easily machined in the right connector.

As a result, it is possible to maintain the desired driving performance at low costs while preventing the enlargement in size of the vehicle that includes the leanable body frame and the two front wheels.

The above vehicle may be configured as follows. The left axle is disposed above a lower end of the left front inner tube and a lower end of the left rear inner tube, and is disposed between the left front inner tube and the left rear inner tube. The right axle is disposed above a lower end of the right front inner tube and a lower end of the right rear inner tube, and is disposed between the right front inner tube and the right rear inner tube.

By disposing the left axle in the way described above, in such a state that the left shock absorber is compressed to its maximum extent, a lower end of the left front outer tube and a lower end of the left rear outer tube are positioned closer to the left axle. Consequently, in the event that the sliding lengths (strokes) of the left front outer tube and the left rear outer tube are not changed, the left bracket is positioned closer to the road surface, thus making it possible to prevent the enlargement in size of the vehicle in the up-down direction of the body frame. On the other hand, in the event that the position of the left bracket is not changed, the sliding lengths (strokes) of the left front outer tube and the left rear outer tube are extended, thus making it possible to improve the shock attenuating or absorbing performance of the left shock absorber.

By disposing the right axle in the way described above, in such a state that the right shock absorber is compressed to its maximum extent, a lower end of the right front outer tube and a lower end of the right rear outer tube are positioned closer to the right axle. Consequently, in the event that the sliding lengths (strokes) of the right front outer tube and the right rear outer tube are not changed, the right bracket is positioned closer to the road surface, thus making it possible to prevent the enlargement in size of the vehicle in the up-down direction of the body frame. On the other hand, in the event that the position of the right bracket is not changed, the sliding lengths (strokes) of the right front outer tube and the right rear outer tube are extended, thus making it possible to improve the shock attenuating or absorbing performance of the right shock absorber.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
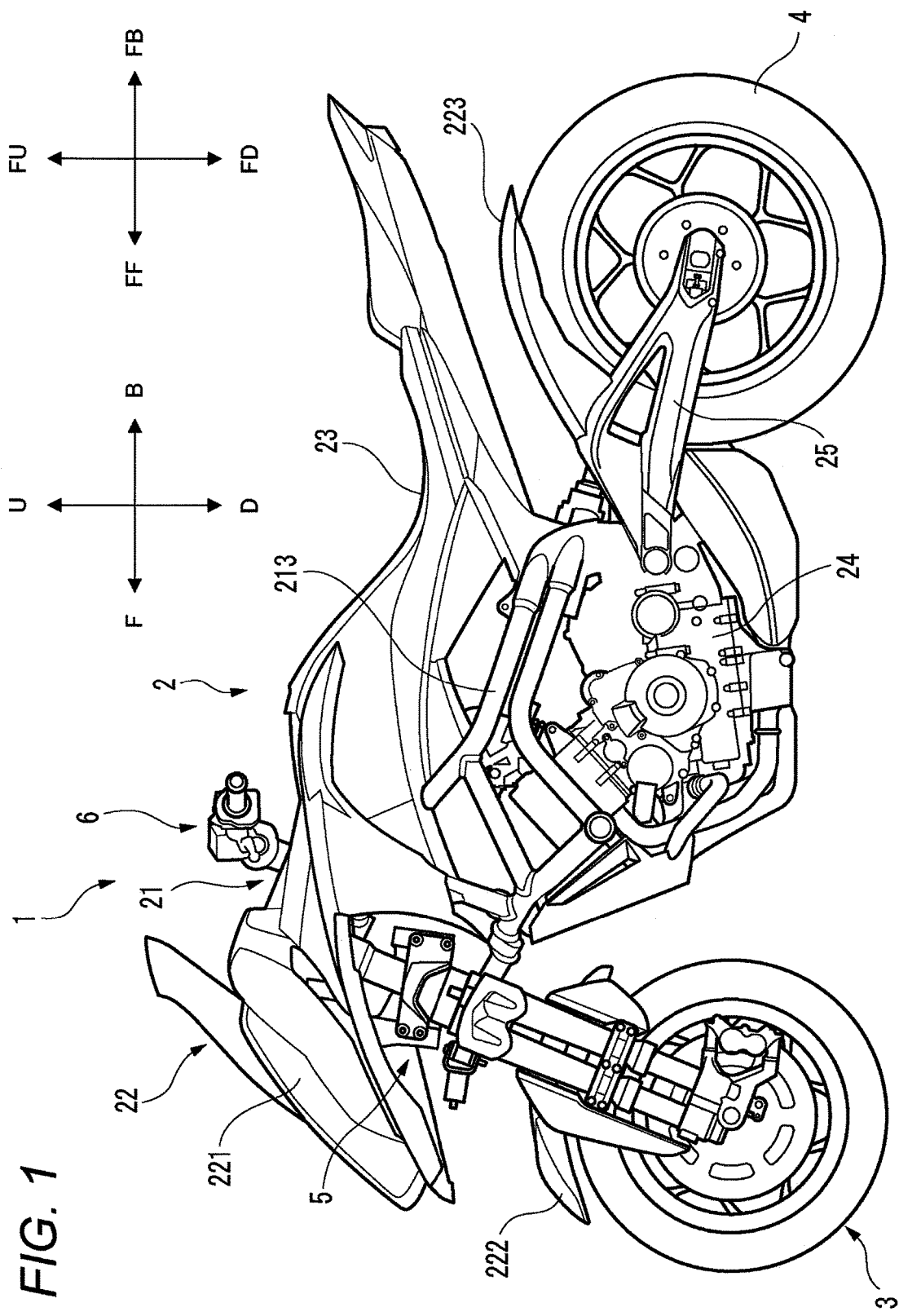
FIG. 1 is a left side view showing an entire vehicle according to a preferred embodiment of the present invention.

Referring to the accompanying drawings, preferred embodiments of the present invention will be described in detail below.

In the accompanying drawings, an arrow F denotes a front or forward direction of a vehicle. An arrow B denotes a back/rear or backward/rearward direction of the vehicle. An arrow U denotes an up or upward direction of the vehicle. An arrow D denotes a down or downward direction of the vehicle. An arrow R denotes a right or rightward direction of the vehicle. An arrow L denotes a left or leftward direction of the vehicle.

A vehicle turns with a body frame being caused to lean to the left or right of the vehicle from a vertical direction. In addition to the directions based on the vehicle, directions based on the body frame will be defined. In the accompanying drawings, an arrow FF denotes a front or forward direction of the body frame. An arrow FB denotes a back/rear or backward/rearward of the body frame. An arrow FU denotes an up or upward direction of the body frame. An arrow FD denotes a down or downward direction of the body frame. An arrow FR denotes a right or rightward direction of the body frame. An arrow FL denotes a left or leftward direction of the body frame.

In this description, a "front-rear direction of the body frame," a "left-right direction of the body frame" and an "up-down direction of the body frame" mean a front-rear direction, a left-right direction and an up-down direction based on the body frame when viewed from a rider who rides the vehicle. "A side of or sideways of the body frame" means directly on the right or left in the left-right direction of the body frame.

In this description, an expression "extending in the front-rear direction of the vehicle body frame" includes a fact that it extends while being inclined in relation to the front-rear direction of the vehicle body frame and means that it extends in a direction closer to the front-rear direction of the vehicle body frame than the left-right direction and up-down direction of the vehicle body frame.

In this description, an expression "extending in the left-right direction of the vehicle body frame" includes a fact that it extends while being inclined in relation to the left-right direction of the vehicle body frame and means that it extends in a direction closer to the left-right direction of the vehicle body frame than the front-rear direction and up-down direction of the vehicle body frame.

In this description, an expression "extending in the up-down direction of the vehicle body frame" includes a fact that it extends while being inclined in relation to the up-down direction of the vehicle body frame and means that it extends in a direction closer to the up-down direction of the vehicle body frame than the left-right direction and front-rear direction of the vehicle body frame.

In this description, an expression reading the "vehicle is standing upright or in an upright state" or the "body frame is standing upright or in the upright state" means a state in which the vehicle is not steered at all and the up-down direction of the body frame coincides with the vertical direction. In this state, the directions based on the vehicle coincide with the directions based on the body frame. When the vehicle is turning with the body frame caused to lean to the left or right from the vertical direction, the left-right direction of the vehicle does not coincide with the left-right direction of the body frame. Similarly, the up-down direction of the vehicle does not coincide with the up-down direction of the body frame. However, the front-rear direction of the vehicle coincides with the front-rear direction of the body frame.

In this description, an expression reading "directly on the left of a member A in the left-right direction of the body frame" denotes a space through which the member A passes when the member A is translated to the left in the left-right direction of the body frame. An expression reading "directly on the right of the member A" is also defined in the same way.

In this description, an expression reading "on the left of the member A in the left-right direction of the body frame" includes not only the space through which the member A passes when the member A is translated to the left in the left-right direction of the body frame but also a space which expands from the space in directions which are at right angles to the left-right direction of the body frame. An expression reading "on the right of the member A" is also defined in the same way.

In this description, an expression reading "directly above the member A in the up-down direction of the body frame" denotes a space through which the member A passes when the member A is translated upwards in the up-down direction of the body frame. An expression reading "directly below the member A" is also defined in the same way.

In this description, an expression reading "above the member A in the up-down direction of the body frame" includes not only the space through which the member A passes when the member A is translated upwards in the up-down direction of the body frame but also a space which expands from the space in directions which are at right angles to the up-down direction of the body frame. An expression reading "below the member A" is also defined in the same way.

In this description, an expression reading "directly ahead of the member A in the front-rear direction of the body frame" denotes a space through which the member A passes when the member A is translated to the front in the front-rear direction of the body frame. An expression reading "directly behind the member A" is also defined in the same way.

In this description, an expression reading "ahead of the member A in the front-rear direction of the body frame" includes not only the space through which the member A passes when the member A is translated to the front in the front-rear direction of the body frame but also a space which expands from the space in directions which are at right angles to the front-rear direction of the body frame. An expression reading "behind the member A" is also defined in the same way.

In this description, "rotation, rotating or rotated" means that a member is displaced at an angle of 360 degrees or more about an axis thereof. In this description, "turn, turning or turned" means that a member is displaced at an angle less than 360 degrees about an axis thereof.

Referring to FIGS. 1 to 11, a vehicle 1 according to preferred embodiments of the present invention will be described. As shown in FIG. 1, the vehicle 1 includes a vehicle main body 2, two front wheels 3, a rear wheel 4, a linkage 5 and a steering member 6. The vehicle 1 includes a leanable body frame and the two front wheels 3 arranged side by side in the left-right direction of the body frame.

The vehicle main body 2 includes a body frame 21, a body cover 22, a seat 23, an engine unit 24, and a rear arm 25.

In FIG. 1, the body frame 21 is in the upright state. The following description to be made while referring to FIG. 1 is based on the premise that the body frame 21 is in the upright state. FIG. 1 is a left side view resulting when the entire vehicle 1 is viewed from the left in the left-right direction of the body frame 21.

Figure 2:
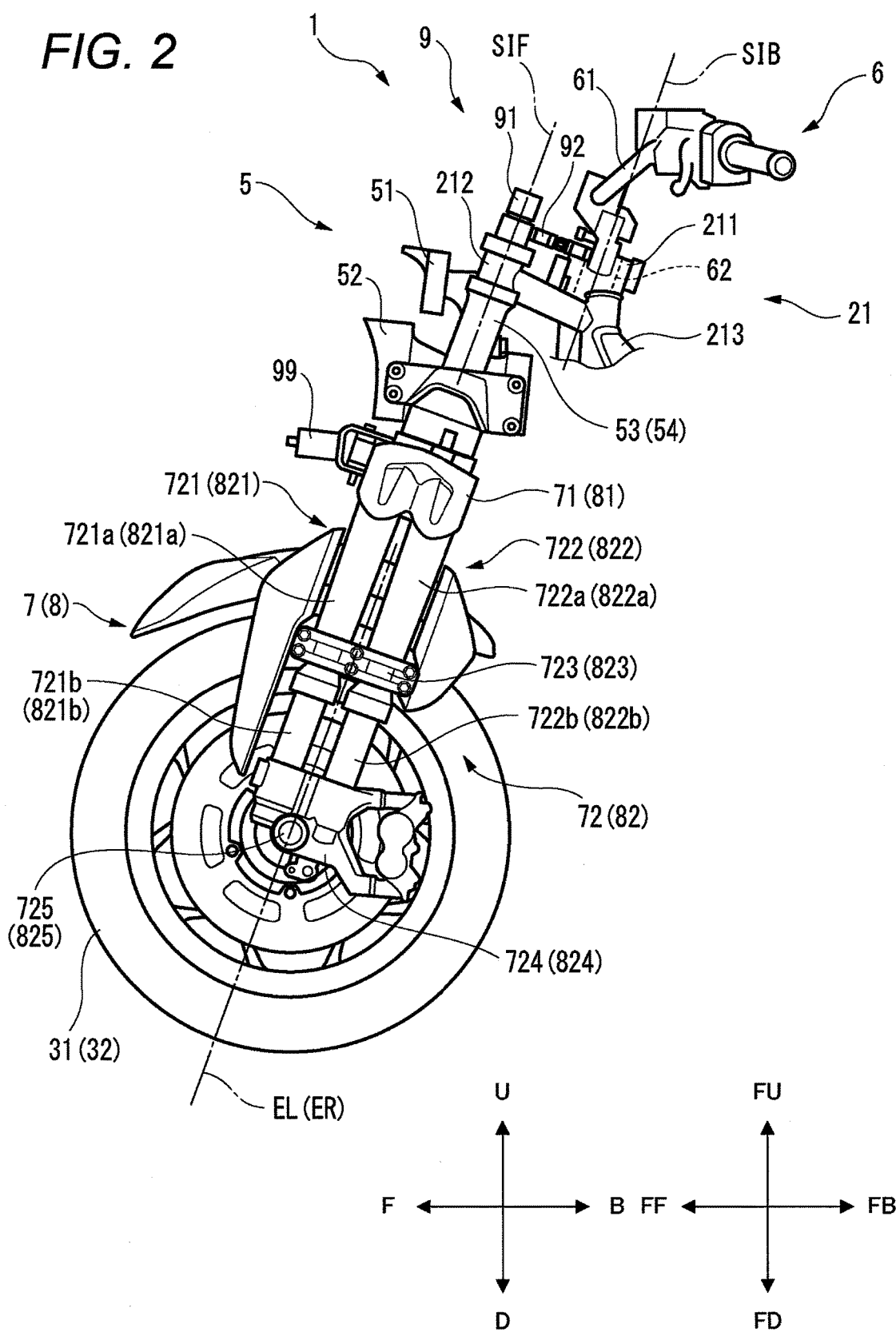
FIG. 2 is a left side view showing a front portion of the vehicle of FIG. 1 in an enlarged manner.

FIG. 2 is a view resulting when a front portion of the vehicle 1 is viewed from the left in the left-right direction of the body frame 21. In FIG. 2, the body frame 21 is in the upright state. The following description to be made while referring to FIG. 2 is based on the premise that the body frame 21 is in the upright state.

The body frame 21 includes a head pipe 211, a link support 212 and a main frame 213. The head pipe 211 supports the steering member 6. The link support 212 supports the linkage 5. The main frame 213 supports the seat 23, the engine unit 24 and the rear arm 25.

The rear arm 25 is disposed directly behind the main frame 213 in the front-rear direction of the body frame 21. The rear arm 25 extends in the front-rear direction of the body frame 21. A front end of the rear arm 25 is supported by the main frame 213 and the engine unit 24 and is able to turn about an axis that extends in the left-to-rear direction of the body frame 21. A rear end of the rear arm 25 supports the rear wheel 4.

The body cover 22 is a body portion that covers at least a portion of a group of constituent elements that define the vehicle 1. The body cover 22 includes a front cover 221, a pair of left and right front fenders 222 and a rear front fender 223.

As shown in FIG. 1, the front cover 221 is disposed directly ahead of the seat 23 in the front-rear direction of the body frame 21. The front cover 221 covers the linkage 5, the steering member 6 and at least a portion of a steering force transmission 9. The front cover 221 is disposed so as not to be movable relative to the body frame 21. In FIG. 2, the front cover 221 is omitted from illustration.

At least portions of the pair of left and right front fenders 222 are individually disposed directly below the front cover 221. At least portions of the pair of left and right front fenders 222 are disposed directly above the pair of left and right front wheels 3, respectively.

At least a portion of the rear wheel 4 is disposed below the seat 23 in the up-down direction of the body frame 21. At least a portion of the rear wheel 4 is disposed directly below the rear front fender 223 in the up-down direction of the body frame 21.

The vehicle 1 according to the present preferred embodiment is a vehicle on which a rider mounts in a posture of straddling the body frame 21. Namely, when riding the vehicle 1, a portion of the body frame 21, which is disposed ahead of the seat 23 on which the rider sits in the front-rear direction of the body frame 21, is disposed between the legs of the rider. The rider rides on the vehicle 1 in a posture of holding the main frame 213 or the front cover 221 that is positioned ahead of the seat 23 in the front-rear direction of the body frame 21 by the legs therebetween.

When viewing the vehicle 1 from the left-right direction of the body frame 21, the engine unit 24 is disposed ahead of a front end of the rear wheel 4 in the front-rear direction of the body frame 21. The engine unit 24 is disposed so as not to be movable relative to the body frame 21. The engine unit 24 is disposed so as not to be movable relative to the main frame 213. The engine 24 produces power to drive the vehicle 1. The driving force produced is transmitted to the rear wheel 4.

The head pipe 211 is disposed at a front portion of the vehicle 1. When viewing the vehicle 1 from the left in the left-right direction of the body frame 21, an upper portion of the head pipe 211 is disposed behind a lower portion of the head pipe 211 in the front-rear direction of the body frame 21.

The steering member 6 includes a handlebar 61 and an upstream steering shaft 62. The upstream steering shaft 62 extends downwards from a central portion of the handlebar 61 in the left-right direction. The upstream steering shaft 62 is supported on the head pipe 211 so as to turn about a rear intermediate steering axis SIB.

The link support 212 is disposed directly ahead of the head pipe 211 in the front-rear direction of the body frame 21. When viewing the vehicle 1 from the left in the left-right direction of the body frame 21, an upper portion of the link support 212 is disposed behind a lower portion of the link support 212 in the front-rear direction of the body frame 21.

Figure 3:
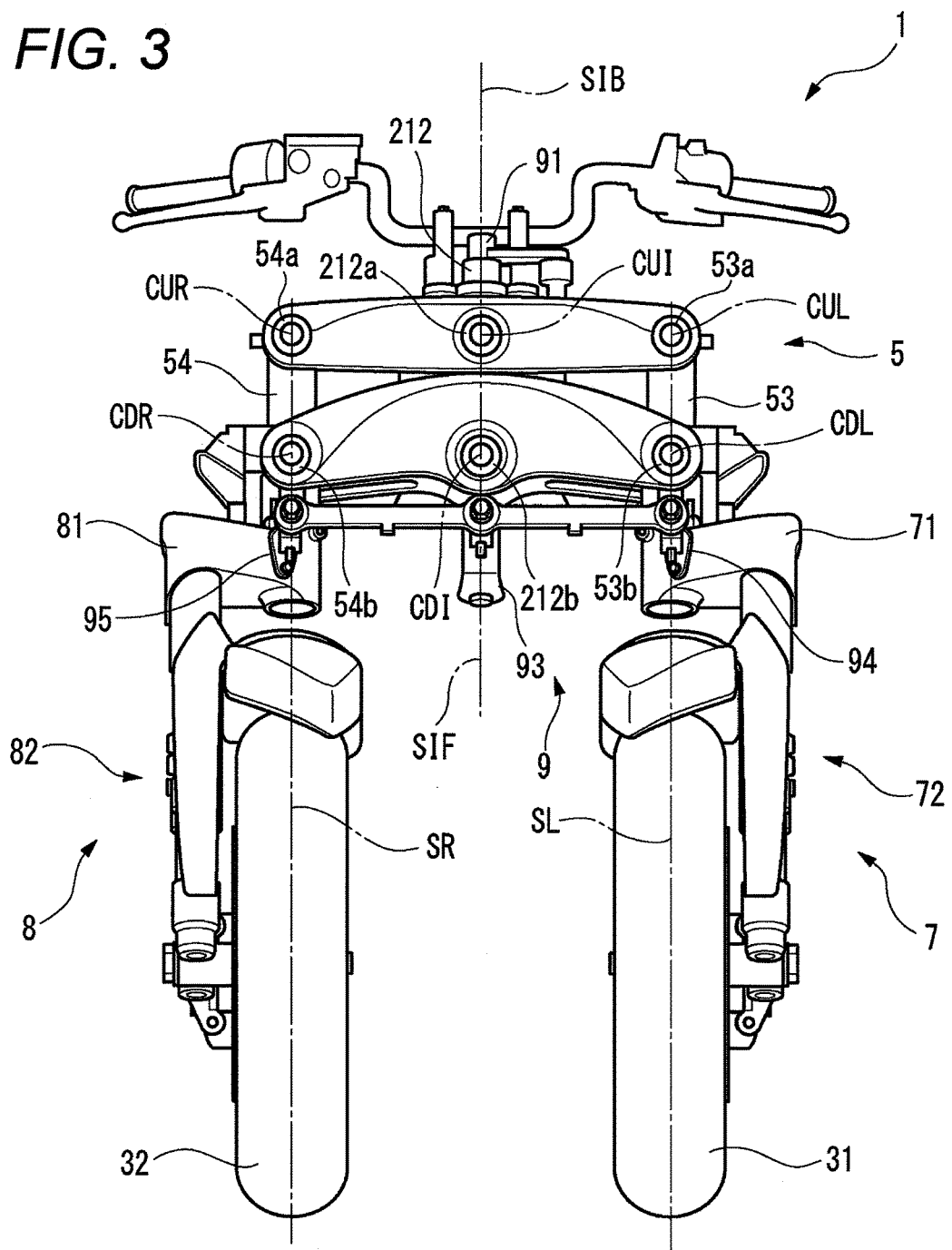
FIG. 3 is a front view showing the front portion of the vehicle of FIG. 1.
Figure 3:
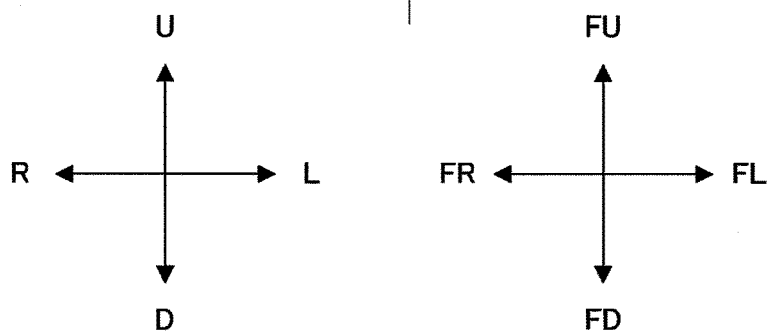

FIG. 3 is a front view of the front portion of the vehicle 1 when viewed from the front in the front-rear direction of the body frame 21. In FIG. 3, the body frame 21 is in the upright state. The following description to be made while referring to FIG. 3 is based on the premise that the body frame 21 is in the upright state. In FIG. 3, the front cover 221 is omitted from illustration.

The two front wheels 3 include a left front wheel 31 and a right front wheel 32. The left front wheel 31 is disposed on the left of the head pipe 211 and the link support 212 which define a portion the body frame 21 in the left-right direction of the body frame 21. The right front wheel 32 is disposed on the right of the head pipe 211 and the link support 212 which define a portion of the body frame 21 in the left-right direction of the body frame 21. The left front wheel 31 and the right front wheel 32 are arranged side by side in the left-right direction of the body frame 21.

In the vehicle 1 according to the present preferred embodiment, the linkage 5 preferably uses a four parallel joint link system (also referred to as a parallelogram link).

The linkage 5 is disposed above the left front wheel 31 and the right front wheel 32 in the up-down direction of the body frame 21. The linkage 5 includes an upper cross member 51, a lower cross member 52, a left side member 53 and a right side member 54. The linkage 5 is not interlocked with the turning of the upstream steering shaft 62 about the rear intermediate steering axis SIB which occurs in association with the operation of the handlebar 61. Namely, the linkage 5 does not turn about the rear intermediate steering axis SIB relative to the body frame 21.

The link support 212 includes an upper intermediate connector 212a. An intermediate portion of the upper cross member 51 is supported on the link support 212 via the upper intermediate connector 212a. The upper cross member 51 is able to turn relative to the link support 212 about an upper intermediate connecting axis CUI that passes the upper intermediate connector 212a and extends in the front-rear direction of the body frame 21.

The link support 212 includes a lower intermediate connector 212b. An intermediate portion of the lower cross member 52 is supported on the link support 212 via the lower intermediate connector 212b. The lower cross member 52 is able to turn relative to the link support 212 about a lower intermediate connecting axis CDI that passes the lower intermediate connector 212b and extends in the front-rear direction of the body frame 21.

The left side member 53 includes an upper left connector 53a. A left end of the upper cross member 51 is connected to the left side member 53 via the upper left connector 53a. The upper cross member 51 is able to turn relative to the left side member 53 about an upper left connecting axis CUL that passes the upper left connecting 53a and which extends in the front-rear direction of the body frame 21.

The right side member 54 includes an upper right connector 54a. A right end of the upper cross member 51 is connected to the right side member 54 via the upper right connector 54a. The upper cross member 51 is able to turn relative to the right side member 54 about an upper right connecting axis CUR that passes the upper right connector 54a and which extends in the front-rear direction of the body frame 21.

The left side member 53 includes a lower left connector 53b. A left end of the lower cross member 52 is connected to the left side member 53 via the lower left connector 53b. The lower cross member 52 is able to turn relative to the left side member 53 about a lower left connecting axis CDL that passes the lower left connecting 53b and which extends in the front-rear direction of the body frame 21.

The right side member 54 includes a lower right connector 54b. A right end of the lower cross member 52 is connected to the right side member 54 via the lower right connector 54b. The lower cross member 52 is able to turn relative to the right side member 54 about a lower right connecting axis CDR that passes the lower right connector 54b and which extends in the front-rear direction of the body frame 21.

Figure 4:
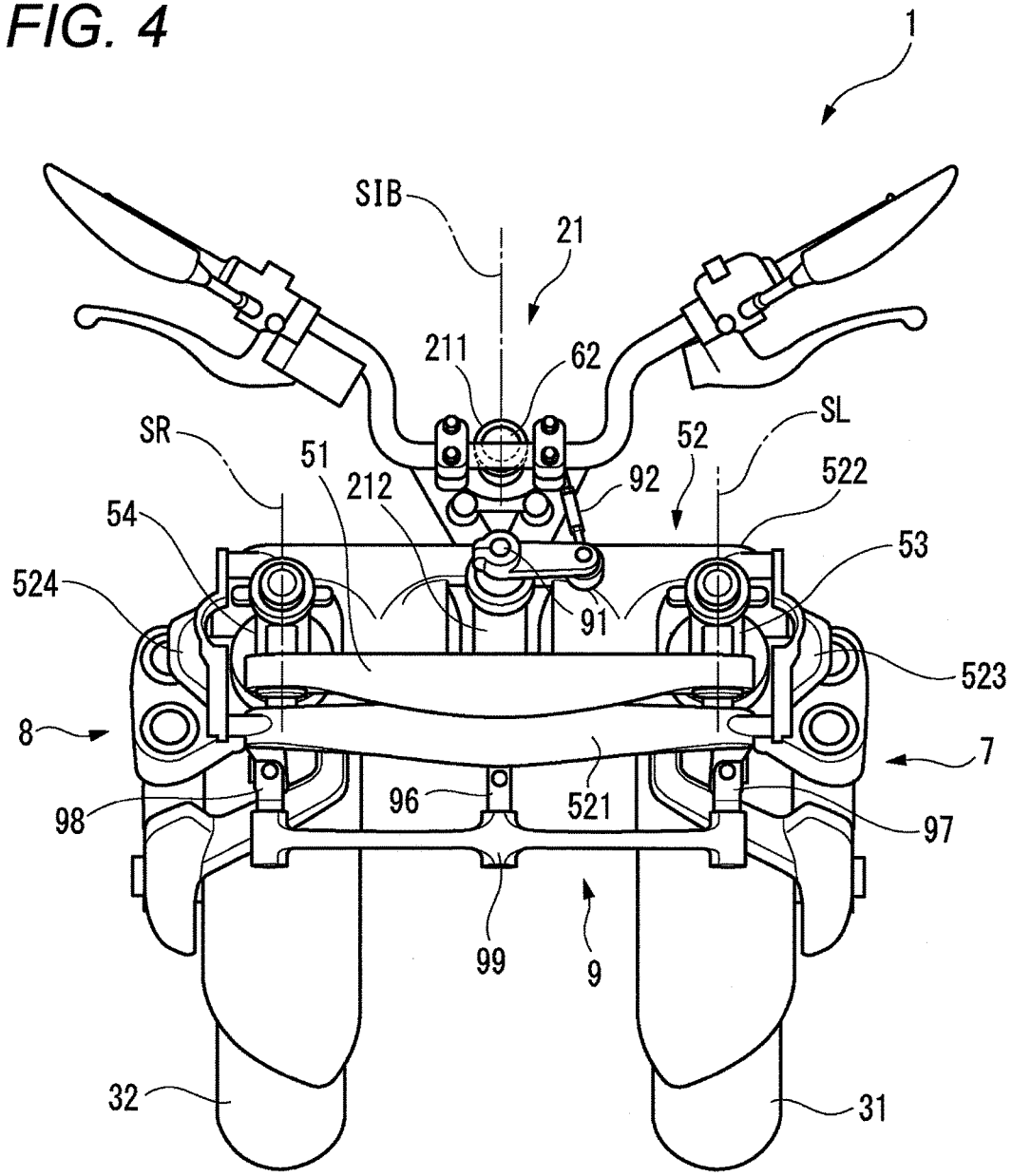
FIG. 4 is a plan view showing the front portion of the vehicle of FIG. 1.
Figure 4:
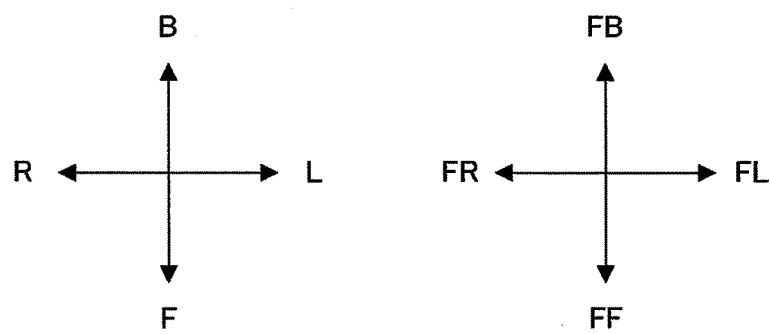

FIG. 4 is a plan view of the front portion of the vehicle 1 when viewed from the above in the up-down direction of the body frame 21. In FIG. 4, the body frame 21 is in the upright state. The following description to be made while referring to FIG. 4 is based on the premise that the body frame 21 is in the upright state. In FIG. 4, the front cover 221 is omitted from illustration.

The upper cross member 51 is disposed ahead of the link support 212 in the front-rear direction of the body frame 21. The upper cross member 51 is a plate member that extends in the left-right direction of the body frame 21 without being curved in the front-rear direction of the body frame 21.

As shown in FIGS. 2 and 4, the lower cross member 52 is disposed below the upper cross member 51 in the up-down direction of the body frame 21. The lower cross member 52 includes a front element 521 and a rear element 522. The front element 521 is disposed ahead of the link support 212, the left side member 53 and the right side member 54 in the front-rear direction of the body frame 21. The rear element 522 is disposed behind the link support 212, the left side member 53 and the right side member 54 in the front-rear direction of the body frame 21. The front element 521 and the rear element 522 extend in the left-right direction of the body frame 21 without being curved in the front-rear direction of the body frame 21.

As shown in FIG. 4, the lower cross member 52 includes a left connector 523 and a right connector 524. The left connector 523 connects a left end of the front element 521 and a left end of the rear element 522 together. The right connector 524 connects a right end of the front element 521 and a right end of the rear element 522.

As shown in FIGS. 3 and 4, the left side member 53 is disposed directly on the left of the link support 212 in the left-right direction of the body frame 21. The left side member 53 is disposed above the left front wheel 31 in the up-down direction of the body frame 21. The left side member 53 extends in a direction in which the link support 212 extends. An upper portion of the left side member 53 is disposed behind a lower portion thereof in the front-rear direction of the body frame 21.

As shown in FIGS. 3 and 4, the right side member 54 is disposed directly on the right of the link support 212 in the left-right direction of the body frame 21. The right side member 54 is disposed above the right front wheel 32 in the up-down direction of the body frame 21. The right side member 54 extends in the direction in which the link support 212 extends. An upper portion of the right side member 54 is disposed behind a lower portion thereof in the front-rear direction of the body frame 21.

The upper cross member 51, the lower cross member 52, the left side member 53 and the right side member 54 are supported on the link support 212 so that the upper cross member 51 and the lower cross member 52 maintain postures that are parallel to each other and the left side member 53 and the right side member 54 maintain postures that are parallel to each other.

As shown in FIGS. 2 to 4, the vehicle 1 includes a left suspension 7. The left suspension 7 includes a left bracket 71 and a left shock absorber 72.

The left bracket 71 includes a left turning member, not shown, that is provided at an upper portion thereof. The left turning member is disposed in an interior of the left side member 53 and extends in the same orientation as the direction in which the left side member 53 extends. The left turning member is able to turn about a left steering axis SL relative to the left side member 53. Namely, the left bracket 71 is connected to the left side member 53 so as to turn about the left steering axis SL. The left steering axis SL extends in the direction in which the left side member 53 extends. As shown in FIG. 3, the left steering axis SL extends parallel to the rear intermediate steering axis SIB of the upstream steering shaft 62 in the up-down direction of the body frame 21. As shown in FIG. 4, the left steering axis SL extends parallel to the rear intermediate steering axis SIB of the upstream steering shaft 62 in the up-down direction of the body frame 21.

The left shock absorber 72 is preferably a so-called telescopic shock absorber mechanism. The left shock absorber 72 attenuates or absorbs a displacement of the left front wheel 31 towards the linkage 5 in the up-down direction of the body frame 21. As shown in FIG. 2, the left shock absorber 72 includes a left front telescopic element 721, a left rear telescopic element 722, a left upper connector 723, a left lower connector 724 and a left axle 725.

The left front telescopic element 721 includes a left front outer tube 721*a* and a left front inner tube 721*b*. An outer diameter of the left front outer tube 721*a* is greater than an outer diameter of the left front inner tube 721*b*. The left front outer tube 721*a* is supported by the left bracket 71. The left front inner tube 721*b* is connected to the left front outer tube 721*a* so as to slide along a left telescopic axis EL.

The left rear telescopic element 722 includes a left rear outer tube 722*a* and a left rear inner tube 722*b*. An outer diameter of the left rear outer tube 722*a* is greater than an outer diameter of the left rear inner tube 722*b*. The left rear outer tube 722*a* is disposed directly behind the left front outer tube 721*a* in the front-rear direction of the body frame 21. The left rear outer tube 722*a* is supported by the left bracket 71. The left rear inner tube 722*b* is disposed directly behind the left front inner tube 721*b* in the front-rear direction of the body frame 21. The left rear inner tube 722*b* is connected to the left rear outer tube 722*a* so as to be slidable within the left rear inner tube 722*b* along the left telescopic axis EL.

The left upper connector 723 connects the left front outer tube 721*a* and the left rear outer tube 722*a* together.

The left lower connector 724 connects the left front inner tube 721*b* and the left rear inner tube 722*b* together.

One end (a left end) of the left axle 725 is supported on the left front inner tube 721*b* and the left rear inner tube 722*b* via the left lower connector 724. The other end (a right end) of the left axle 725 supports the left front wheel 31.

The left shock absorber 72 attenuates or absorbs a displacement of the left front wheel 31 towards the linkage 5 in the up-down direction of the body frame 21. In particular, the left rear telescopic element 722 is provided with a well-known shock absorbing mechanism (not shown) to define a left shock absorber. The left front telescopic element 721, the left upper connector 723 and the left lower connector 724 define a left turn restrictor and restrict the relative turning between the left rear outer tube 722*a* and the left rear inner tube 722*b*.

As shown in FIGS. 2 to 4, the vehicle 1 includes a right suspension 8. The right suspension 8 includes a right bracket 81 and a right shock absorber 82. The configuration of the right shock absorber 8 is symmetrical with the left suspension 7 relative to the front-rear direction of the body frame 21. Thus, the right suspension 8 is not illustrated separately, and only reference numerals for the right suspension 8 will be shown in FIG. 2.

The right bracket 81 includes a right turning member, not shown, at an upper portion thereof. The right turning member is disposed in an interior of the right side member 54 and extends in the same orientation as the direction in which the right side member 54 extends. The right turning member is able to turn about a right steering axis SR relative to the right side member 54. Namely, the right bracket 81 is connected to the right side member 54 so as to turn about the right steering axis SR. The right steering axis SR extends in the direction in which the right side member 54 extends. As shown in FIG. 3, the right steering axis SR extends parallel to the rear intermediate steering axis SIB of the upstream steering shaft 62 in the up-down direction of the body frame 21. As shown in FIG. 4, the right steering axis SR extends parallel to the rear intermediate steering axis SIB of the upstream steering shaft 62 in the up-down direction of the body frame 21.

The right shock absorber 82 is preferably a so-called telescopic shock absorber. As shown in FIG. 2, the right shock absorber 82 includes a right front telescopic element 821, a right rear telescopic element 822, a right upper connector 823, a right lower connector 824 and a right axle 825.

The right front telescopic element 821 includes a right front outer tube 821*a* and a right front inner tube 821*b*. An outer diameter of the right front outer tube 821*a* is greater than an outer diameter of the right front inner tube 821*b*. The right front outer tube 821*a* is supported by the right bracket 81. The right front inner tube 821*b* is connected to the right front outer tube 821*a* so as to be slidable within the right front outer tube 821*a* along a right telescopic axis ER.

The right rear telescopic element 822 includes a right rear outer tube 822*a* and a right rear inner tube 822*b*. An outer diameter of the right rear outer tube 822*a* is greater than an outer diameter of the right rear inner tube 822*b*. The right rear outer tube 822*a* is disposed directly behind the right front outer tube 821*a* in the front-rear direction of the body frame 21. The right rear outer tube 822*a* is supported by the right bracket 81. The right rear inner tube 822*b* is disposed directly behind the right front inner tube 821*b* in the front-rear direction of the body frame 21. The right rear inner tube 822*b* is connected to the right rear outer tube 822*a* so as to slide along the right telescopic axis ER.

The right upper connector 823 connects the right front outer tube 821*a* and the right rear outer tube 822*a* together.

The right lower connector 824 connects the right front inner tube 821*b* and the right rear inner tube 822*b* together.

One end (a right end) of the right axle 825 is supported on the right front inner tube 821*b* and the right rear inner tube 822*b* via the right lower connector 824. The other end (a left end) of the right axle 825 supports the right front wheel 32.

The right shock absorber 82 attenuates or absorbs a displacement of the right front wheel 32 towards the linkage 5 in the up-down direction of the body frame 21. In particular, the right rear telescopic element 822 is provided with a well-known shock absorbing mechanism (not shown) to define a right shock absorber. The right front telescopic element 821, the right upper connector 823 and the right lower connector 824 define a right turn restrictor and restrict the relative turning between the right rear outer tube 822a and the right rear inner tube 822b.

As shown in FIGS. 2 to 4, the vehicle 1 includes a steering force transmission 9. The steering force transmission 9 includes a downstream steering shaft 91, a connector 92, an intermediate transmission plate 93, a left transmission plate 94, a right transmission plate 95, an intermediate joint 96, a left joint 97, a right joint 98 and a tie-rod 99.

The downstream steering shaft 91 is supported on the link support 212 so as to turn about a front intermediate steering axis SIF. The front intermediate steering axis SIF extends parallel to the rear intermediate steering axis SIB about which the upstream steering shaft 62 turns.

The connector 92 connects the upstream steering shaft 62 and the downstream steering shaft 91 together. The connector 92 is displaced in association with the turning of the upstream steering shaft 62. The downstream steering shaft 91 turns in association with the displacement of the connector 92. Namely, the connector 92 transmits a turning operation of the upstream steering shaft 62 to the downstream steering shaft 91.

The intermediate transmission plate 93 is connected to a lower portion of the downstream steering shaft 91. The intermediate transmission plate 93 is not able to turn relative to the downstream steering shaft 91. The intermediate transmission plate 93 is able to turn about the front intermediate steering axis SIF relative to the link support 212.

The left transmission plate 94 is disposed directly on the left of the intermediate transmission plate 93 in the left-right direction of the body frame 21. The left transmission plate 94 is connected to a lower portion of the left bracket 71. The left transmission plate 94 is not able to turn relative to the left bracket 71. The left transmission plate 94 is able to turn about the left steering axis SL relative to the left side member 53.

The right transmission plate 95 is disposed directly on the right of the intermediate transmission plate 93 in the left-right direction of the body frame 21. The right transmission plate 95 is connected to a lower portion of the right bracket 81. The right transmission plate 95 is not able to turn relative to the right bracket 81. The right transmission plate 95 is able to turn about the right steering axis SR relative to the right side member 54.

As shown in FIG. 4, the intermediate joint 96 is connected to a front portion of the intermediate transmission plate 93 via a shaft that extends in the up-down direction of the body frame 21. The intermediate transmission plate 93 and the intermediate joint 96 are able to turn relative to each other about this shaft.

The left joint 97 is disposed on the left of the intermediate joint 96 in the left-right direction of the body frame 21. The left joint 97 is connected to a front portion of the left transmission plate 94 via a shaft that extends in the up-down direction of the body frame 21. The left transmission plate 94 and the left joint 97 are able to turn relative to each other about this shaft.

The right joint 98 is disposed on the right of the intermediate joint 96 in the left-right direction of the body frame 21. The right joint 98 is connected to a front portion of the right transmission plate 95 via a shaft that extends in the up-down direction of the body frame. The right transmission plate 95 and the right joint 98 are able to turn relative to each other about this shaft.

A shaft that extends in the front-rear direction of the body frame 21 is provided at a front portion of the intermediate joint 96. A shaft that extends in the front-rear direction of the body frame 21 is provided at a front portion of the left joint 97. A shaft that extends in the front-rear direction of the body frame 21 is provided at a front portion of the right joint 98.

The tie-rod 99 extends in the left-right direction of the body frame 21. The tie-rod 99 is connected to the intermediate joint 96, the left joint 97 and the right joint 98 via those shafts. The tie-rod 99 and the intermediate joint 96 are able to turn relative to each other about the shaft that is provided at the front portion of the intermediate joint 96. The tie-rod 99 and the left joint 97 are able to turn relative to each other about the shaft that is provided at the front portion of the left joint 97. The tie-rod 99 and the right joint 98 are able to turn relative to each other about the shaft that is provided at the front portion of the right joint 98.

The left transmission plate 94 is connected to the intermediate transmission plate 93 via the left joint 97, the tie-rod 99, and the intermediate joint 96. The right transmission plate 95 is connected to the intermediate transmission plate 93 via the right joint 98, the tie-rod 99 and the intermediate joint 96. The left transmission plate 94 and the right transmission plate 95 are connected to each other via the left joint 97, the tie-rod 99 and the right joint 98. In other words, the tie-rod 99 connects the intermediate transmission plate 93 to the left transmission plate 94 and the right transmission plate 95.

Figure 5:
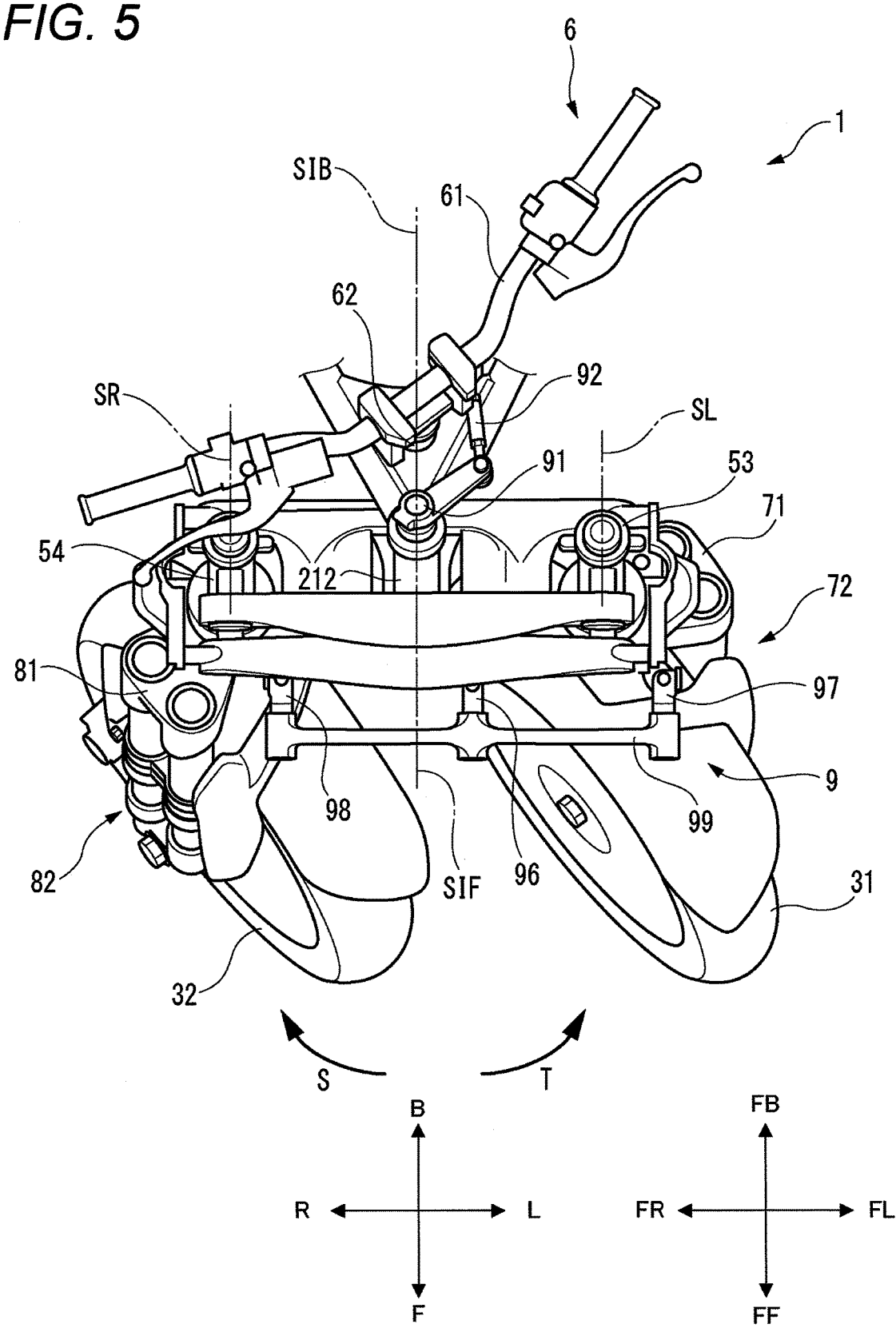
FIG. 5 is a plan view showing the front portion of the vehicle of FIG. 1 when steering is performed.

Next, referring to FIGS. 4 and 5, a steering operation of the vehicle 1 will be described. FIG. 5 is a plan view of the front portion of the vehicle 1 that is in such a state that the left front wheel 31 and the right front wheel 32 are turned to the left, as viewed from above in the up-down direction of the body frame 21. In FIG. 5, the front cover 221 is omitted from illustration.

When the rider operates the handlebar 61, the upstream steering shaft 62 is turned about the rear intermediate steering axis SIB relative to the head pipe 211. The turning operation of the upstream steering shaft 62 is transmitted to the downstream steering shaft 91 via the connector 92. When the turning of the upstream steering shaft 62 is so transmitted to the downstream steering shaft 91, the downstream steering shaft 91 is turned relative to the link support 212 about the front intermediate steering axis SIF. In the case of the downstream steering shaft 91 being turned to the left as shown in FIG. 5, the steering shaft 91 turns in a direction indicated by an arrow T. In association with the turning of the downstream steering shaft 91, the intermediate transmission plate 93 turns in the direction indicated by the arrow T about the front intermediate steering axis SIF relative to the link support 212.

In association with the turning of the intermediate transmission plate 93 in the direction indicated by the arrow T, the intermediate joint 96 turns relative to the intermediate transmission plate 93 in a direction indicated by an arrow S. This causes the tie-rod 99 to move to the left in the left-right direction of the body frame 21 and to the rear in the front-rear direction of the body frame 21 while maintaining its posture.

In association with the movement of the tie-rod 99, the left joint 97 and the right joint 98 turn in the direction indicated by the arrow S relative to the left transmission plate 94 and the right transmission plate 95, respectively. This turns the left transmission plate 94 and the right transmission plate 95 in the direction indicated by the arrow T while allowing the tie-rod 99 to maintain its posture.

When the left transmission plate 94 turns in the direction indicated by the arrow T, the left bracket 71, which is not able to turn relative to the left transmission plate 94, is turned in the direction indicated by the arrow T about the left steering axis SL relative to the left side member 53.

When the right transmission plate 95 turns in the direction indicated by the arrow T, the right bracket 81, which is not able to turn relative to the right transmission plate 95, is turned in the direction indicated by the arrow T about the right steering axis SR relative to the right side member 54.

When the left bracket 71 is turned in the direction indicated by the arrow T, the left shock absorber 72, which is supported on the left bracket 71, is turned in the direction indicated by the arrow T about the left steering axis SL relative to the left side member 53. When the left shock absorber 72 is turned in the direction indicated by the arrow T, the left front wheel 31, which is supported on the left shock absorber 72, is turned in the direction indicated by the arrow T about the left steering axis SL relative to the left side member 53.

When the right bracket 81 is turned in the direction indicated by the arrow T, the right shock absorber 82, which is supported on the right bracket 81, is turned in the direction indicated by the arrow T about the right steering axis SR relative to the right side member 54. When the right shock absorber 82 is turned in the direction indicated by the arrow T, the right front wheel 32, which is supported on the right shock absorber 82, is turned in the direction indicated by the arrow T about the right steering axis SR relative to the right side member 54.

When the rider operates the handlebar 61 so as to turn to the right, the elements described above turn in opposite directions to the directions in which they turn when the vehicle turns to the left. Since the elements merely move the other way around in relation to the left-right direction, detailed description thereof will be omitted here.

Thus, as has been described above, the steering member 6 transmits the steering force to the left front wheel 31 and the right front wheel 32 in response to the operation of the handlebar 61 by the rider. The left front wheel 31 and the right front wheel 32 turn about the left steering axis SL and the right steering axis SR, respectively, in the direction corresponding to the direction in which the handlebar 61 is operated by the rider.

Figure 6:
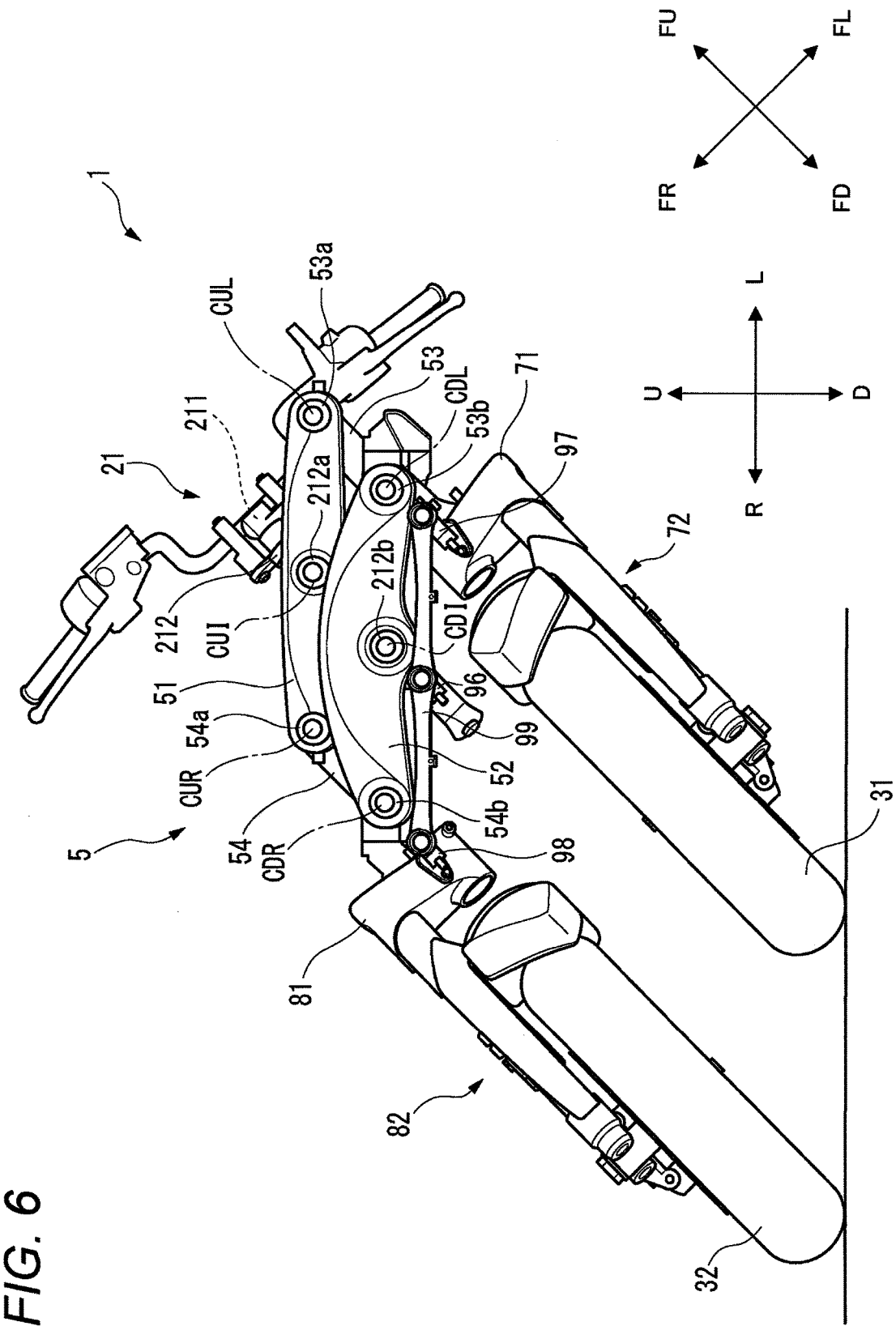
FIG. 6 is a front view showing the front portion of the vehicle of FIG. 1 when leaning is performed.

Next, referring to FIGS. 3 and 6, a leaning operation of the vehicle 1 will be described. FIG. 6 is a front view of the front portion of the vehicle 1, when viewed from the front in the front-rear direction of the body frame 21, with the body frame 21 caused to lean to the left of the vehicle 1. In FIG. 6, the front cover 221 is omitted from illustration.

As shown in FIG. 3, when looking at the vehicle 1 from the front of the body frame 21 that is standing upright, the linkage 5 has a rectangular shape. As shown in FIG. 6, when looking at the vehicle 1 from the front of the body frame 21 that is leaning, the linkage 5 has a parallelogram shape. The operation of the linkage 5 is interlocked with the leaning of the body frame 21 in the left-right direction. The operation of the linkage 5 means that the shape of the linkage 5 changes as a result of the upper cross member 51 and the lower cross member 52 turning relative to the link support 212 about the upper intermediate connecting axis CUI and the lower intermediate connecting axis CDI, respectively, and the upper cross member 51, the lower cross member 52, the left side member 53 and the right side member 54 turning relatively about the upper left connecting axis CUL, the upper right connecting axis CUR, the lower left connecting axis CDL and the lower right connecting axis CDR, respectively.

For example, as shown in FIG. 6, when the rider causes the vehicle 1 to lean to the left, the head pipe 211 and the link support 212 lean to the left from the vertical direction. When the head pipe 211 and the link support 212 lean, the upper cross member 51 turns counterclockwise about the upper intermediate connecting axis CUI that passes the upper intermediate connector 212a relative to the link support 212 when viewed from the front of the vehicle 1. Similarly, the lower cross member 52 is turned counterclockwise about the lower intermediate connecting axis CDI that passes the lower intermediate connector 212b relative to the head pipe 211 when viewed from the front of the vehicle 1. This causes the upper cross member 51 to move to the left in the left-right direction of the body frame 21 relative to the lower cross member 52.

By moving in the way described above, the upper cross member 51 turns counterclockwise about the upper left connecting axis CUL that passes the upper left connector 53a and the upper right connecting axis CUR that passes the upper right connector 54a relative to the left side member 53 and the right side member 54, respectively when viewed from the front of the vehicle 1. Similarly, the lower cross member 52 turns counterclockwise about the lower left connecting axis CDL that passes the lower left connector 53b and the lower right connecting axis CDR that passes the lower right connector 54b relative to the left side member 53 and the right side member 54, respectively, when viewed from the front of the vehicle 1. By moving in the way described above, the left side member 53 and the right side member 54 lean to the left of the vehicle 1 from the vertical direction while maintaining postures that are parallel to the head pipe 211 and the link support 212.

As this occurs, the lower cross member 52 moves to the left in the left-right direction of the body frame 21 relative to the tie-rod 99. As a result of the lower cross member 52 moving in the way described above, the shafts that are provided at the respective front portions of the intermediate joint 96, the left joint 97 and the right joint 98 turn relative to the tie-rod 99. This allows the tie-rod 99 to hold a posture that is parallel to the upper cross member 51 and the lower cross member 52.

As the left side member 53 leans to the left of the vehicle 1, the left bracket 71 that is supported on the left side member 53 via the left turning member leans to the left of the vehicle 1. In association with the leftward leaning of the left bracket 71, the left shock absorber 72 that is supported on the left bracket 71 also leans to the left of the vehicle 1. As a result of the left shock absorber 72 leaning in the way described above, the left front wheel 31 that is supported on the left shock absorber 72 leans to the left of the vehicle 1 while maintaining a posture that is parallel to the head pipe 211 and the link support 212.

As the right side member 54 leans to the left of the vehicle 1, the right bracket 81 that is supported on the right side member 54 via the right turning member leans to the left of the vehicle 1. In association with the leftward leaning of the right bracket 81, the right shock absorber 82 that is supported on the right bracket 81 also leans to the left of the vehicle 1. As a result of the right shock absorber 82 leaning in the way described above, the right front wheel 32 that is supported on the right shock absorber 82 leans to the left of the vehicle 1 while maintaining a posture that is parallel to the head pipe 211 and the link support 212.

The description of the leaning operations of the left front wheel 31 and the right front wheel 32 is made based on the vertical direction. However, when the vehicle 1 leans (when the linkage 5 is operated), the up-down direction of the body frame 21 is not coincident with the vertical direction. In the event of this being described based on the up-down direction of the body frame 21, when the linkage 5 is operated, the left front wheel 31 and the right front wheel 32 change their relative positions in the up-down direction of the body frame 21. In other words, the linkage 5 changes the relative positions of the left front wheel 31 and the right front wheel 32 in the up-down direction of the body frame 21 to cause the body frame 21 to lean to the left or right of the vehicle 1 from the vertical direction.

When the rider causes the vehicle 1 to lean to the right, the elements lean to the right. Since the elements merely move the other way around in relation to the left-right direction, detailed description thereof will be omitted here.

Figure 7:
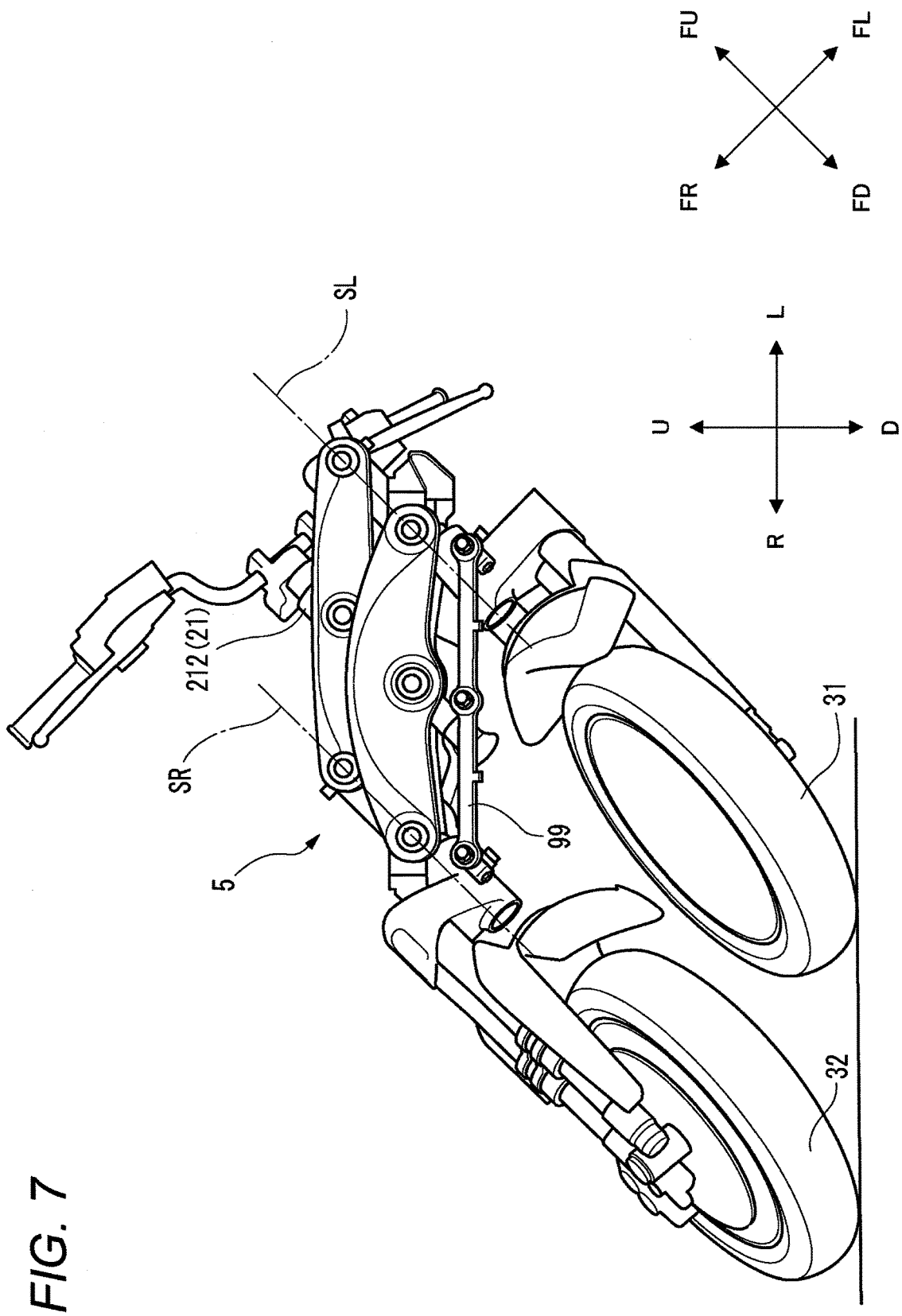
FIG. 7 is a front view showing the front portion of the vehicle of FIG. 1 when steering and leaning are performed.

FIG. 7 is a front view of the front portion of the vehicle 1, when viewed from the front in the front-rear direction of the body frame 21, in such a state that the vehicle 1 is caused to lean and turn. FIG. 7 shows a state in which the vehicle 1 is steered or turned to the left while being caused to lean to the left. In FIG. 7, the front cover 221 is omitted from illustration.

When a steering operation is performed, the left front wheel 31 is turned counterclockwise about the left steering axis SL, while the right front wheel 32 is turned counterclockwise about the right steering axis SR. When a leaning operation is performed, the left front wheel 31 and the right front wheel 32 lean to the left of the vehicle 1 together with the body frame 21. Namely, in this state, the linkage 5 has the parallelogram shape. The tie-rod 99 moves to the left in the left-right direction of the body frame 21 and to the rear in the front-rear direction of the body frame 21 from the position where the body frame 21 is in the upright state.

Figure 8:
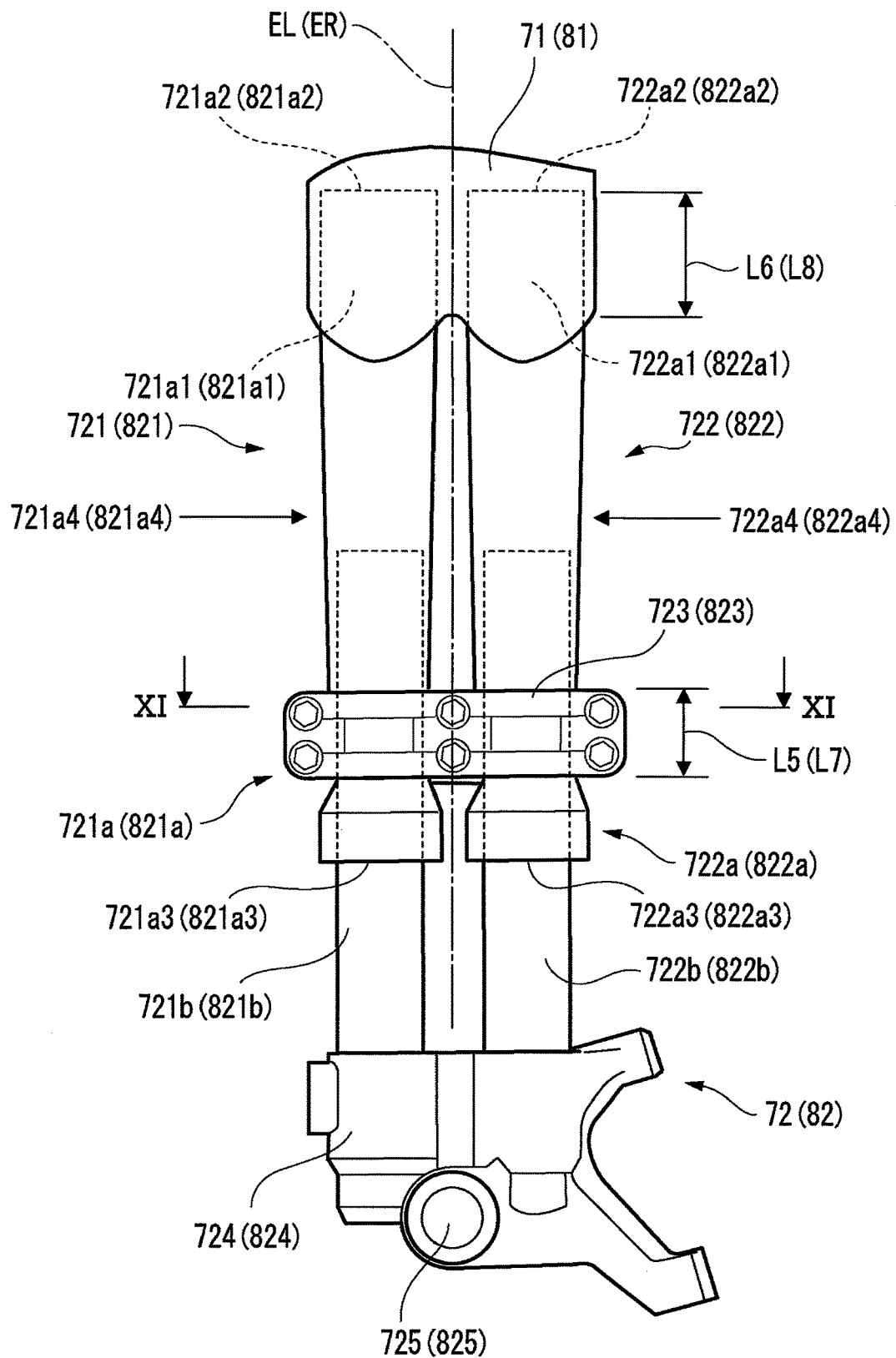
FIG. 8 is a left side view showing a left suspension of the vehicle of FIG. 1.

Next, referring to FIGS. 8 to 11, detailed configurations of the left shock absorber 72 and the right shock absorber 82 will be described. FIG. 8 shows the left shock absorber 72 as viewed from the left of the vehicle 1. In FIG. 8, the shape of the left bracket 71 is simplified as a matter of convenience in description. The configuration of the right shock absorber 82 is symmetrical with the configuration of the left shock absorber 72 as viewed from the left of the vehicle 1 in relation to the front-rear direction. Thus, an individual illustration of the right shock absorber 82 is omitted, and only reference numerals related thereto will be shown in FIG. 8.

As described above, the left shock absorber 72 includes the left front telescopic element 721, the left rear telescopic element 722, the left upper connector 723, the left lower connector 724 and the left axle 725. The left front telescopic element 721 includes the left front outer tube 721a and the left front inner tube 721b. The left rear telescopic element 722 includes the left rear outer tube 722a and the left rear inner tube 722b.

The left front inner tube 721b is connected to the left front outer tube 721a so as to be slidable along a left telescopic axis EL inside the left front outer tube 721a. The left rear inner tube 722b is connected to the left rear outer tube 722a so as to be slidable along the left telescopic axis EL inside the left rear outer tube 722a.

On the other hand, the right shock absorber 82 includes the right front telescopic element 821, the right rear telescopic element 822, the right upper connector 823, the right lower connector 824 and the right axle 825. The right front telescopic element 821 includes the right front outer tube 821a and the right front inner tube 821b. The right rear telescopic element 822 includes the right rear outer tube 822a and the right rear inner tube 822b.

The right front inner tube 821b is connected to the right front outer tube 821a so as to be slidable along a right telescopic axis ER inside the right front outer tube 821a. The right rear inner tube 822b is connected to the right rear outer tube 822a so as to be slidable along the right telescopic axis ER inside the right rear outer tube 822a.

In the case of the vehicle 1 including the two front wheels 3 as described above, it is possible to impart a characterized driving performance (in particular, a behavior from a straight driving state to an initial stage of steering) to the vehicle 1 by setting the toe angle and the camber angle as required for both the front wheels 3.

The inventors of preferred embodiments of the present invention considered enhancing the overall rigidity of the left shock absorber 72 by using the configuration in which the left front outer tube 721a having the greater diameter than that of the left front inner tube 721b and the left rear outer tube 722a having the greater diameter than that of the left rear inner tube 722b are supported by the left bracket 71. Likewise, the inventors considered enhancing the overall rigidity of the right shock absorber 82 by using the configuration in which the right front outer tube 821a having the greater diameter than that of the right front inner tube 821b and the right rear outer tube 822a having the greater diameter than that of the right rear inner tube 822b are supported by the right bracket 81.

However, as a result of using the configurations described above, the inventors discovered the situation in which the toe angle and the camber angle deviated from the initially set values such that the desired driving performance could not be obtained. As a result of studying the cause for the situation described above, the following facts were discovered: (i) a twist is caused between the front outer tube and the front inner tube and between the rear outer tube and the rear inner tube due to the fact that the predetermined caster angles are set individually for the shock absorbers; (ii) each of the supporting structure of the left front wheel by the left axle and the supporting structure of the right front wheel by the right axle is of a cantilever type; and (iii) the twist causes the toe angle and the camber angle to deviate from the initially set values.

Accordingly, the inventors conceived that connecting the left front outer tube 721a and the left rear outer tube 722a together by the left upper connector 723 further enhances the rigidity of the left shock absorber 72 and prevents twist that is caused by the load applied to the left front wheel 31 from the road surface, thus making it possible to prevent the influence of twist on the toe angle and the camper angle that are set for the left front wheel 31. Likewise, the inventors conceived that connecting the right front outer tube 821a and the right rear outer tube 822a together by the right upper connector 823 further enhances the rigidity of the right shock absorber 82 and prevents twist that is caused by the load applied to the right front wheel 32 from the road surface, thus making it possible to prevent the influence of twist on the toe angle and the camber angle that are set for the right front wheel 32.

According to the configuration described above, the overall rigidity of the left shock absorber 72 is enhanced as well as twist caused by the load applied to the left front wheel 31 from the road surface is prevented, thus making it possible to prevent the influence of twist on the toe angle and the camper angle that are set for the left front wheel 31. On the other hand, the necessity of increasing the diameters of the left front outer tube 721a, the left front inner tube 721b, the left rear outer tube 722a and the left rear inner tube 722b in order to enhance the rigidity is obviated, thus making it possible to prevent the enlargement in size of the left shock absorber 72.

Likewise, the overall rigidity of the right shock absorber 82 is enhanced as well as twist caused by the load applied to the right front wheel 32 from the road surface is prevented, thus making it possible to prevent the influence of twist on the toe angle and the camper angle that are set for the right front wheel 32. On the other hand, the necessity of increasing the diameters of the right front outer tube 821a, the right front inner tube 821b, the right rear outer tube 822a and the right rear inner tube 822b in order to enhance the rigidity is obviated, thus making it possible to prevent the enlargement in size of the right shock absorber 82.

As a result, it is possible to obtain a desired driving performance while preventing the enlargement in size of the vehicle 1 that includes the leanable body frame 21 and the two front wheels 3.

By using the configuration in which the left front outer tube 721a and the left rear outer tube 722a are connected together by the left upper connector 723 that are individual members, an extruded material having superior rigidity and strength is able to be used as the left front outer tube 721a and the left rear outer tube 722a. In this case, it is possible to further enhance the rigidity of the left shock absorber 72.

By using the configuration in which the right front outer tube 821a and the right rear outer tube 822a are connected together by the right upper connector 823 that are individual members, an extruded material having superior rigidity and strength is able to be used as the right front outer tube 821a and the right rear outer tube 822a. In this case, it is possible to further enhance the rigidity of the right shock absorber 82.

As shown in FIG. 8, the left bracket 71 supports an upper end 721a1 of the left front outer tube 721a and an upper end 722a1 of the left rear outer tube 722a. The left upper connector 723 connects a portion that is located closer to a lower end 721a3 than a left front midpoint 721a4 that is situated halfway between an upper end 721a2 and the lower end 721a3 of the left front outer tube 721a with a portion that is located closer to a lower end 722a3 than a left rear midpoint 722a4 that is situated halfway between an upper end 722a2 and the lower end 722a3 of the left rear outer tube 722a.

Namely, the left upper connector 723 connects together the positions that are closer to the lower end 721a3 of the left front outer tube 721a and the lower end 722a3 of the left rear outer tube 722a than the upper end 721a2 of the left front outer tube 721a and the upper end 722a2 of the left rear outer tube 722a that are supported by the left bracket 71. The rigidity against twist is enhanced by arranging the left upper connector 723 to be spaced as far as possible away from the supporting position by the bracket 71. Consequently, it is possible to further prevent the influence by the load applied to the left front wheel 31 from the road surface on the toe angles and the camber angles set for the left front wheel 31 and the right front wheel 32.

As shown in FIG. 8, the right bracket 81 supports an upper end 821a1 of the right front outer tube 821a and an upper end 822a1 of the right rear outer tube 822a. The right upper connector 823 connects a portion that is located closer to a lower end 821a3 than a right front midpoint 821a4 that is situated at halfway between an upper end 821a2 and the lower end 821a3 of the right front outer tube 821a with a portion that is located closer to a lower end 822a3 than a right rear midpoint 822a4 that is situated at halfway between an upper end 822a2 and the lower end 822a3 of the right rear outer tube 822a.

Namely, the right upper connector 823 connects together the positions that are closer to the lower end 821a3 of the right front outer tube 821a and the lower end 822a3 of the right rear outer tube 822a than the upper end 821a2 of the right front outer tube 821a and the upper end 822a2 of the right rear outer tube 822a that are supported by the right bracket 81. The rigidity against twist is enhanced by arranging the right upper connector 823 to be spaced as far as possible away from the supporting position by the bracket 81. Consequently, it is possible to further prevent the influence by the load applied to the right front wheel 32 from the road surface on the toe angles and the camber angles set for the left front wheel 31 and the right front wheel 32.

As a result, it is possible to improve the maintainability of the desired driving performance while preventing the enlargement in size of the vehicle 1 that includes the leanable body frame 21 and the two front wheels 3.

As described above, the left shock absorber 72 attenuates or absorbs the displacement of the left front wheel 31 relative to the linkage 5 in the up-down direction of the body frame 21. Specifically, the left rear inner tube 722b slides along the left telescopic axis EL in the interior of the left rear outer tube 722a defining a left shock absorber while activating a known shock absorbing mechanism (not shown).

Figure 9:
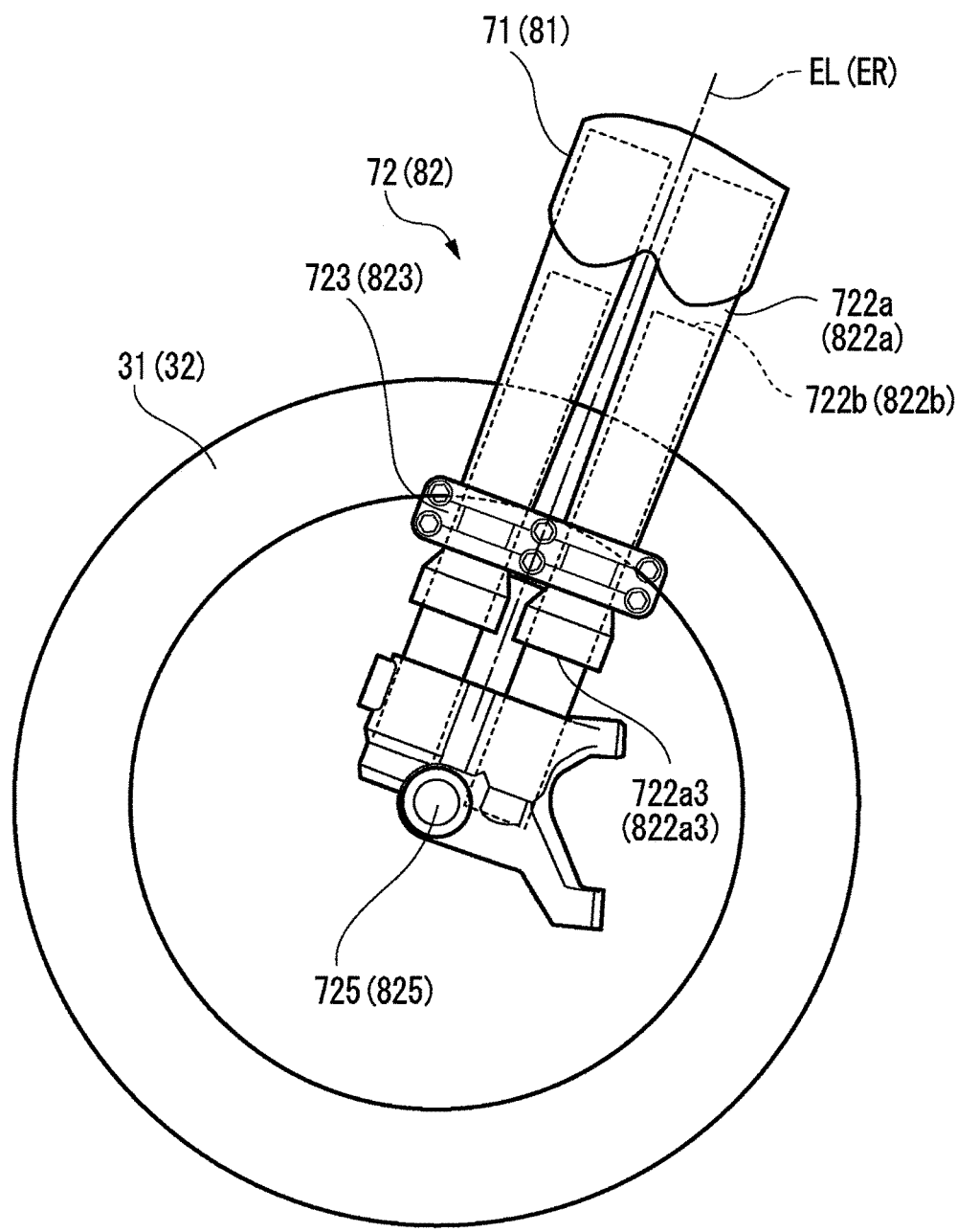
FIG. 9 is a left side view showing a state that the left suspension is in operation.

The lower end 722a3 of the left rear outer tube 722a and the left axle 725 approach each other according to the displacement of the left front wheel 31. FIG. 9 shows a state in which the lower end 722a3 of the left rear outer tube 722a and the left axle 725 approach each other into a closest state (a state in which the left shock absorber 72 is compressed to a maximum extent). In this state, the left upper connector 723 is disposed in a position where the left upper connector 723 overlaps the left front wheel 31 as viewed from the left-right direction of the body frame 21.

By setting the positional relationship between the left upper connector 723 and the left front wheel 31 in the way described above, the left upper connector 723 is disposed in a position that is spaced are enough from the supporting position by the left bracket 71. This enhances the rigidity against twist. Consequently, it is possible to further prevent the influence by the load applied to the left front wheel 31 from the road surface on the toe angle and the camber angle set for the left front wheel 31.

The configuration of the right shock absorber 82 is symmetrical with the configuration of the left shock absorber 72 as viewed from the left of the vehicle 1 in relation to the front-rear direction. Thus, an individual illustration of the right shock absorber 82 is omitted, and only reference numerals related thereto will be shown in FIG. 9. As described above, the right shock absorber 82 attenuates or absorbs the displacement of the right front wheel 32 relative to the linkage 5 in the up-down direction of the body frame 21. Specifically, the right rear inner tube 822b slides along the right telescopic axis ER in the interior of the right rear outer tube 822a, thus defining a right shock absorber while activating a known shock absorbing mechanism (not shown).

The lower end 822a3 of the right rear outer tube 822a and the right axle 825 approach each other according to the displacement of the right front wheel 32. FIG. 9 shows a state in which the lower end 822a3 of the right rear outer tube 822a and the right axle 825 approach each other into a closest state (a state in which the right shock absorber 82 is compressed to a maximum extent). In this state, the right upper connector 823 is disposed in a position where the right upper connector 823 overlaps the right front wheel 32 as viewed from the left-right direction of the body frame 21.

By setting the positional relationship between the right upper connector 823 and the right front wheel 32 in the way described above, the right upper connector 823 is disposed in a position that is spaced far enough from the supporting position by the right bracket 81. This enhances the rigidity against twist. Consequently, it is possible to further prevent the influence by the load applied to the right front wheel 32 from the road surface on the toe angle and the camber angle set for the right front wheel 32.

As a result, it is possible to improve the maintainability of the desired driving performance while preventing the enlargement in size of the vehicle 1 that includes the leanable body frame 21 and the two front wheels 3.

Figure 10:
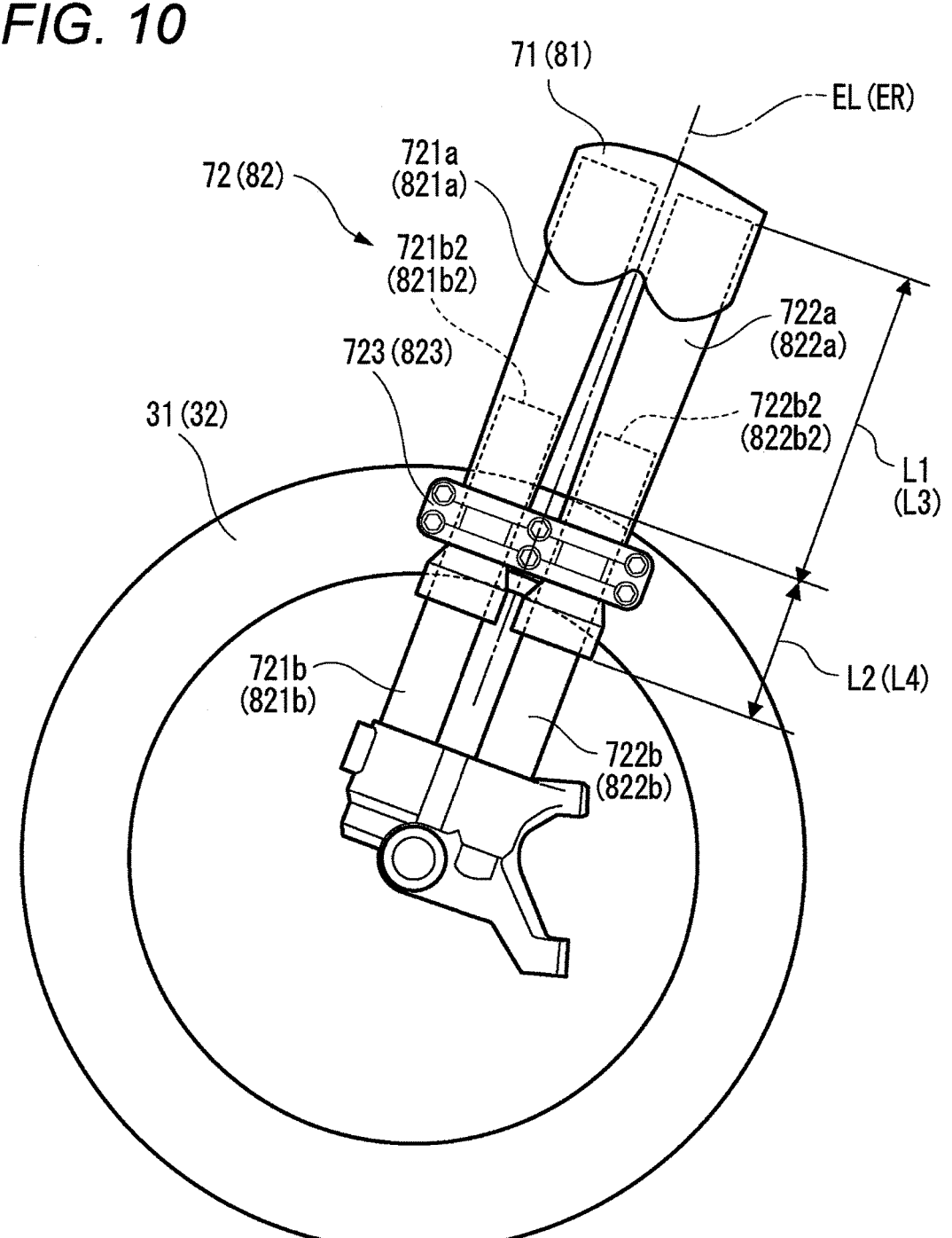
FIG. 10 is a left side view showing the left suspension in a condition that the vehicle of FIG. 1 is standing upright while no steering operation is performed.

FIG. 10 is a left side view of the left shock absorber 72 as viewed from the left in the left-right direction of the body frame 21 in such a state that the body frame 21 is in the upright state while the left front wheel 31 and the right front wheel 32 are not turned at all by the steering member 6. The configuration of the right shock absorber 82 is symmetrical with the configuration of the left shock absorber 72 as viewed from the left of the vehicle 1 in relation to the front-rear direction. Thus, an individual illustration of the right shock absorber 82 is omitted, and only reference numerals related thereto will be shown in FIG. 10.

In this state, the left upper connector 723 is disposed in a position where the left upper connector 723 overlaps the left front wheel 31 as viewed from the left-right direction of the body frame 21. In addition, the right upper connector 823 is disposed in a position where the right upper connector 823 overlaps the right front wheel 32 as viewed from the left-right direction of the body frame 21.

By using the configuration in which the above-described positional relationship between the left upper connector 723 and the left front wheel 31 is established also in such a state that the body frame 21 is in the upright state while the left front wheel 31 and the right front wheel 32 are not turned at all by the steering member 6, in addition to the advantageous effect described above, the rigidity against twist is further prevented. Consequently, it is possible to further prevent the influence by the load applied to the left front wheel 31 from the road surface on the toe angle and the camber angle set for the left front wheel 31.

By using the configuration in which the positional relationship between the right upper connector 823 and the right front wheel 32 is established also in such a state that the body frame 21 is in the upright state while the left front wheel 31 and the right front wheel 32 are not turned at all by the steering member 6, in addition to the advantageous effect described above, the rigidity against twist is further increased. Consequently, it is possible to further prevent the influence by the load applied to the right front wheel 32 from the road surface on the toe angle and the camber angle set for the right front wheel 32.

As a result, it is possible to further improve the maintainability of the desired driving performance while preventing the enlargement in size of the vehicle 1 that includes the leanable body frame 21 and the two front wheels 3.

As shown in FIG. 10, in such a state that the body frame 21 is in the upright state while the left front wheel 31 and the right front wheel 32 are not turned at all by the steering member 6, a dimension L1 along the left telescopic axis EL of a portion of the left rear outer tube 722a that is situated above the left front wheel 31 as viewed from the left-right direction of the body frame 21 is greater than a dimension L2 along the left telescopic axis EL of a portion of the left rear outer tube 722a that overlaps the left front wheel 31 as viewed from the left-right direction of the body frame 21. In addition, an upper end 722b2 of the left rear inner tube 722b is disposed above the left upper connector 723 in the up-down direction of the body frame 21.

By setting the positional relationship between the left rear outer tube 722a and the left front wheel 31 in the way described above, a sufficient sliding length (stroke) for the left rear inner tube 722b is easily ensured. On the other hand, by setting the positional relationship between the upper end 722b2 of the left rear inner tube 722b and the left upper connector 723 in the way described above, a sufficient fitting length of the left rear inner tube 722b in the left rear outer tube 722a is easily ensured. Consequently, it is easy to ensure the shock absorbing performance and the rigidity of the left shock absorber 72.

As shown in FIG. 10, in such a state that the body frame 21 is in the upright state while the left front wheel 31 and the right front wheel 32 are not turned at all by the steering member 6, a dimension L3 along the right telescopic axis ER of a portion of the right rear outer tube 822a that is situated above the right front wheel 32 as viewed from the left-right direction of the body frame 21 is greater than a dimension L4 along the right telescopic axis ER of a portion of the right rear outer tube 822a that overlaps the right front wheel 32 as viewed from the left-right direction of the body frame 21. In addition, an upper end 822b2 of the right rear inner tube 822b is disposed above the right upper connector 823 in the up-down direction of the body frame 21.

By setting the positional relationship between the right rear outer tube 822a and the right front wheel 32 in the way described above, a sufficient sliding length (stroke) for the right rear inner tube 822b is easily ensured. On the other hand, by setting the positional relationship between the upper end 822b2 of the right rear inner tube 822b and the right upper connector 823 in the way described above, a sufficient fitting length of the right rear inner tube 822b in the right rear outer tube 822a is easy to be ensured. Consequently, it is easy to ensure the shock absorbing performance and the rigidity of the right shock absorber 82.

As a result, it is possible to improve the maintainability of the desired driving performance while preventing the enlargement in size of the vehicle 1 that includes the leanable body frame 21 and the two front wheels 3.

As shown in FIG. 8, a dimension L5 along the left telescopic axis EL of the left rear outer tube 722a that is held by the left upper connector 723 is smaller than a dimension L6 along the left telescopic axis EL of a portion of the left rear outer tube 722a that is held by the left bracket 71.

By setting the dimension of the left upper connector 723 along the left telescopic axis EL in the way described above, it becomes easy to avoid interference of the left upper connector 723 with its peripheral members when the left rear outer tube 722a slides while ensuring the function to improve the rigidity of the left shock absorber 72 as a result of providing the left upper connector 723. Consequently, it is possible to prevent the enlargement in size of the peripheral structure of the left shock absorber 72 that would otherwise occur in order to avoid the interference described above.

As shown in FIG. 8, a dimension L7 along the right telescopic axis ER of the right rear outer tube 822a that is held by the right upper connector 823 is smaller than a dimension L8 along the right telescopic axis ER of a portion of the right rear outer tube 822a that is held by the right bracket 81.

By setting the dimension of the right upper connector 823 along the right telescopic axis ER in the way described above, it becomes easy to avoid interference of the right upper connector 823 with its peripheral members when the right rear outer tube 822*a* slides while ensuring the function to improve the rigidity of the right shock absorber 82 as a result of providing the right upper connector 823. Consequently, it is possible to prevent the enlargement in size of the peripheral structure of the right shock absorber 82 that would otherwise occur in order to avoid the interference described above.

As a result, it is possible to improve the maintainability of the desired driving performance while preventing the enlargement in size of the vehicle 1 that includes the leanable body frame 21 and the two front wheels 3.

Figure 11:
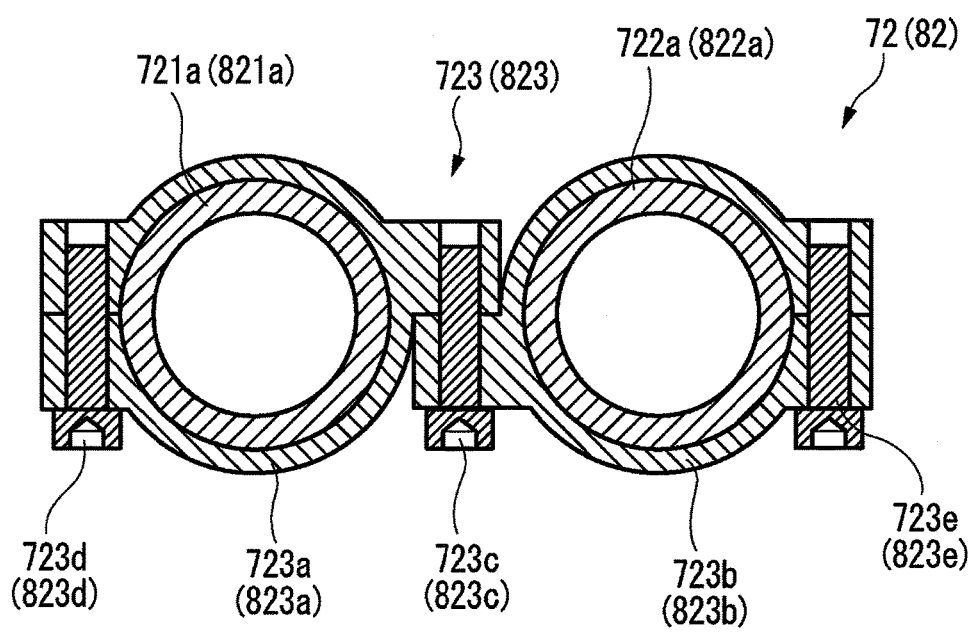
FIG. 11 is a section view showing a portion of the left suspension.

FIG. 11 shows a portion of the left shock absorber 72 that results when a section taken along a line XI-XI in FIG. 8 is viewed from a direction indicated by arrows. The configuration of the right shock absorber 82 is symmetrical relative to the left-right direction with the configuration of the left shock absorber 72 as viewed from the left of the vehicle 1. Thus, the illustration of the right shock absorber 82 is omitted, and only reference numerals related thereto will be shown in FIG. 11.

As shown in FIG. 11, the left upper connector 723 includes a left front connector 723*a* and a left rear connector 723*b*. The left front connector 723*a* and the left rear connector 723*b* are fastened together by a fastening member 723*c* to connect the left front outer tube 721*a* and the left rear outer tube 722*a* together.

According to this configuration, the efficiency of assembling the left shock absorber 72 is improved remarkably compared with a case where the left front outer tube 721*a* and the left rear outer tube 722*a* are assembled to the left upper connector 723 by a single connector.

As shown in FIG. 11, the right upper connector 823 includes a right front connector 823*a* and a right rear connector 823*b*. The right front connector 823*a* and the right rear connector 823*b* are fastened together by a fastening member 823*c* to connect the right front outer tube 821*a* and the right rear outer tube 822*a* together.

According to this configuration, the efficiency of assembling the right shock absorber 82 is improved remarkably compared with a case where the right front outer tube 821*a* and the right rear outer tube 822*a* are assembled to the right upper connector 823 by a single connector.

As a result, it is possible to efficiently improve the maintainability of the desired driving performance while preventing the enlargement in size of the vehicle 1 that includes the leanable body frame 21 and the two front wheels 3.

As shown in FIG. 11, the left front connector 723*a* holds the left front outer tube 721*a*. The left rear connector 723*b* holds the left rear outer tube 722*a*.

According to this configuration, the left front connector 723*a* and the left rear connector 723*b* are able to be assembled in advance to the left front outer tube 721*a* and the left rear outer tube 722*b*, respectively. As this occurs, by fastening the left front connector 723*a* and the left rear connector 723*b* together, the left front outer tube 721*a* and the left rear outer tube 722*a* are connected together. Consequently, the efficiency of assembling the left shock absorber 72 is further improved.

As shown in FIG. 11, the right front connector 823*a* holds the right front outer tube 821*a*. The right rear connector 823*b* holds the right rear outer tube 822*a*.

According to this configuration, the right front connector 823*a* and the right rear connector 823*b* are able to be assembled in advance to the right front outer tube 821*a* and the right rear outer tube 822*b*, respectively. As this occurs, by fastening the right front connector 823*a* and the right rear connector 823*b* together, the right front outer tube 821*a* and the right rear outer tube 822*a* are connected together. Consequently, the efficiency of assembling the right shock absorber 82 is further improved.

As a result, it is possible to efficiently improve the maintainability of the desired driving performance while preventing the enlargement in size of the vehicle 1 that includes the leanable body frame 21 and the two front wheels 3.

The fastening member 723*c* may be a bolt, for example. As this occurs, the left front connector 723*a* and the left rear connector 723*b* may be fastened together with a simple configuration.

The fastening member 823*c* may be a bolt, for example. As this occurs, the right front connector 823*a* and the right rear connector 823*b* may be fastened together with the simple configuration.

As a result, it is possible to efficiently improve the maintainability of the desired driving performance while preventing the enlargement in size of the vehicle 1 that includes the leanable body frame 21 and the two front wheels 3.

As shown in FIG. 11, the left front connector 723*a* holds an outer circumferential surface of the left front outer tube 721*a* by a split fastening structure that employs a fastening member 723*d*. The fastening member 723*d* is a bolt, for example. The left rear connector 723*b* holds an outer circumferential surface of the left rear outer tube 722*a* by a split fastening structure that uses a fastening member 723*e*. The fastening member 723*e* is a bolt, for example.

According to this configuration, stress exerted on the left front outer tube 721*a* as a result of being held by the left front connector 723*a* is easily dispersed. In addition, stress exerted on the left rear outer tube 722*a* as a result of being held by the left rear connector 723*b* is easily dispersed.

As shown in FIG. 11, the right front connector 823*a* holds an outer circumferential surface of the right front outer tube 821*a* by a split fastening structure that uses a fastening member 823*d*. The fastening member 823*d* is a bolt, for example. The right rear connector 823*b* holds an outer circumferential surface of the right rear outer tube 822*a* by a split fastening structure that uses a fastening member 823*e*. The fastening member 823*e* is a bolt, for example.

According to this configuration, stress exerted on the right front outer tube 821*a* as a result of being held by the right front connector 823*a* is easily dispersed. In addition, stress exerted on the right rear outer tube 822*a* as a result of being held by the right rear connector 823*b* is easily dispersed.

As a result, it is possible to further improve the maintainability of the desired driving performance while preventing the enlargement in size of the vehicle 1 that includes the leanable body frame 21 and the two front wheels 3.

Figure 12:
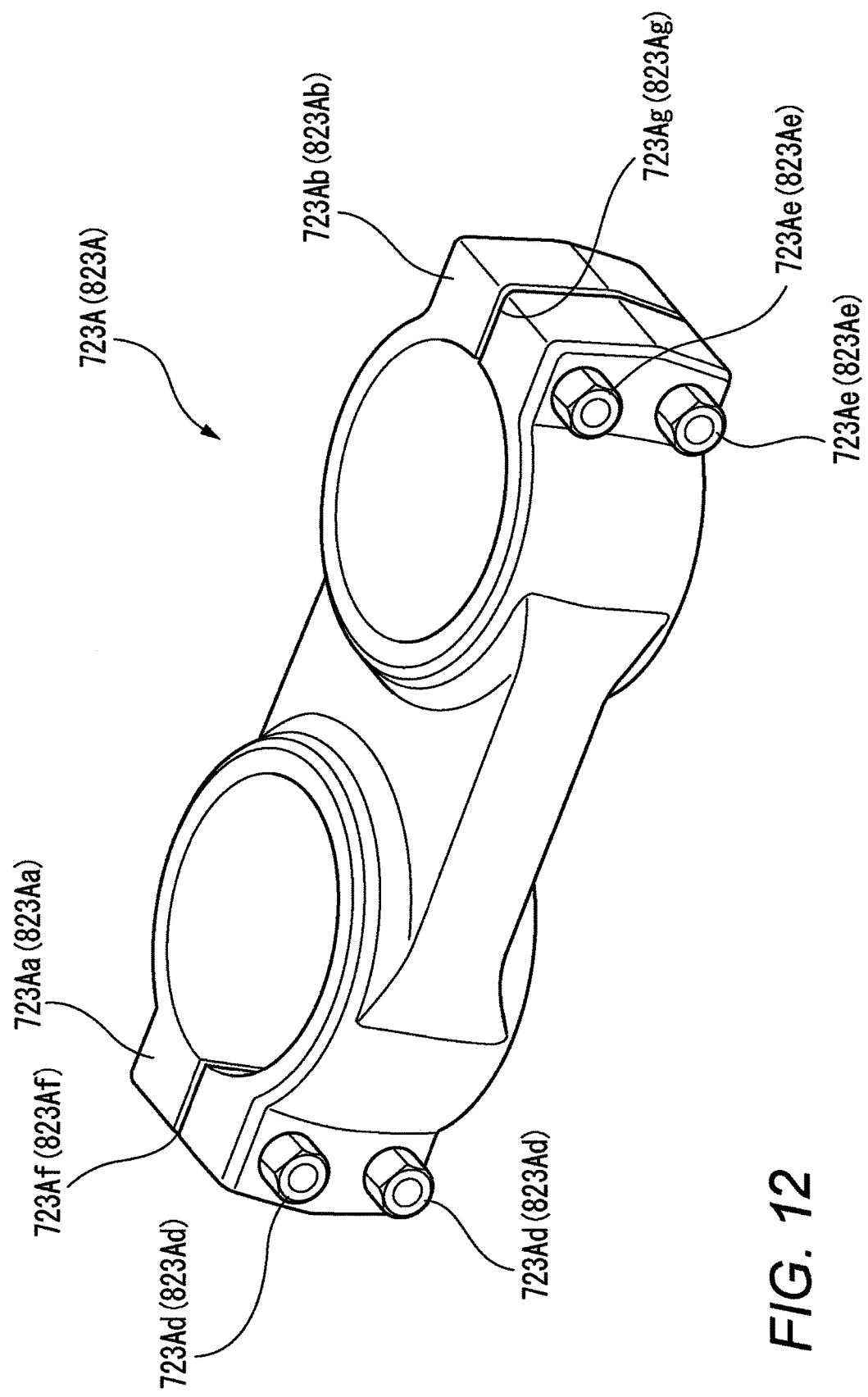
FIG. 12 is a perspective view showing a modified example of a left upper connector in the left suspension.
Figure 13A:
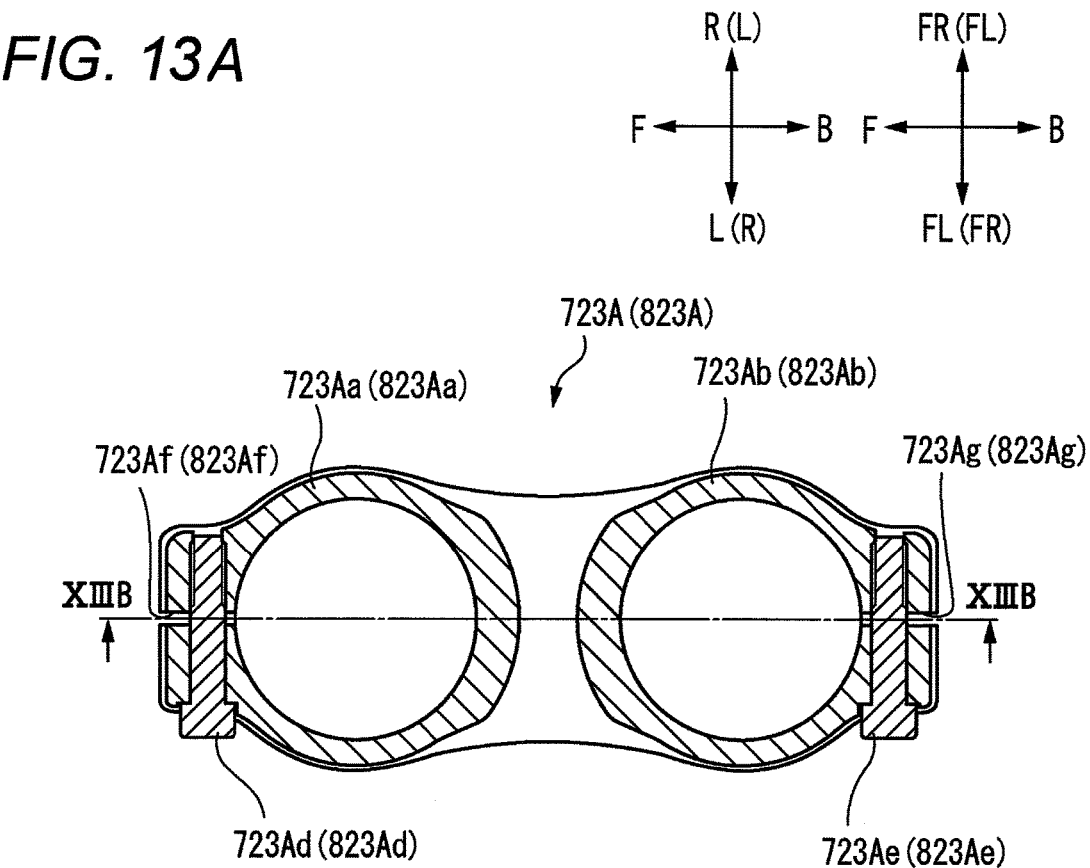
FIGS. 13A and 13B are section views each showing a portion of the left upper connector according to the modified example.
Figure 13B:
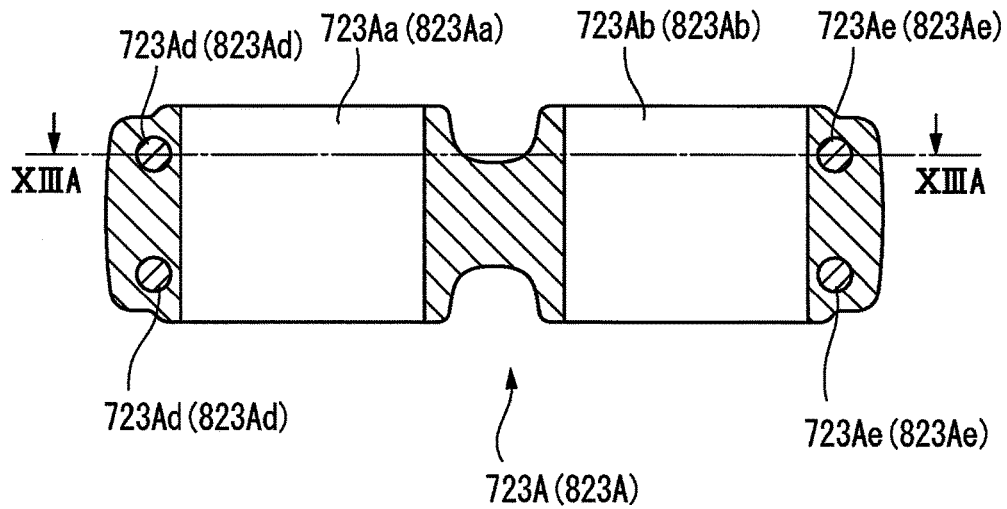

Next, referring to FIGS. 12, 13A and 13B, a modified example made to the left upper connector 723 and the right upper connector 823 will be described. FIG. 12 is a perspective view showing an external appearance of a left upper connector 723A according to the modified example. FIGS. 13A and 13B are sectional views showing a portion of the left upper connector 723A. FIG. 13A shows a section that results when a section taken along a line XIIIA-XIIIA in FIG. 13B is seen from a direction indicated by arrows. FIG. 13B shows a section that results when a section taken along a line XIIIB-XIIIB in FIG. 13A is seen from a direction indicated by arrows. The configuration of a right upper connector 823A according to the modified example is symmetrical relative to the left-right direction with the configuration of the left upper connector 723A. Thus, the illustration of the right upper connector 823A is omitted, and only reference numerals related thereto will be shown in the figures.

As shown in FIGS. 12, 13A and 13B, the left upper connector 723A includes a left front connector 723Aa and a left rear connector 723Ab. The left front connector 723Aa holds the left front outer tube 721*a*. The left rear connector 723Ab holds the left rear outer tube 722*a*.

Specifically, the left front connector 723Aa includes a left front slit 723Af. The left front slit 723Af extends along the left telescopic axis EL (refer to FIG. 10). A gap defined between portions of the left front connector 723Aa that is divided by the left front slit 723Af can be varied according to the outside diameter of the left front outer tube 721*a*, and the portions are fastened together by a fastening member 723Ad. Namely, the left front connector 723Aa uses a so-called split fastening structure.

On the other hand, the left rear connector 723Ab includes a left rear slit 723Ag. The left rear slit 723Ag extends along the left telescopic axis EL (refer to FIG. 10). A gap defined between portions of the left rear connector 723Ab that is divided by the left rear slit 723Ag can be varied according to the outside diameter of the left rear outer tube 722*a*, and the portions are fastened together by a fastening member 723Ae. Namely, the left rear connector 723Ab uses a so-called split fastening structure.

According to this configuration, stress exerted on the left front outer tube 721*a* as a result of being held by the left front connector 723Aa is easily dispersed. Likewise, stress exerted on the left rear outer tube 722*a* as a result of being held by the left rear connector 723Ab is easily dispersed. Further, it is possible to reduce the number of parts to obtain these advantageous effects.

Likewise, the right front connector 823Aa includes a right front slit 823Af. The right front slit 823Af extends along the right telescopic axis ER (refer to FIG. 10). A gap defined between portions of the right front connector 823Aa that is divided by the right front slit 823Af can be varied according to the outside diameter of the right front outer tube 821*a*, and the portions are fastened together by a fastening member 823Ad. Namely, the right front connector 823Aa uses a so-called split fastening structure.

On the other hand, the right rear connector 823Ab includes a right rear slit 823Ag. The right rear slit 823Ag extends along the right telescopic axis ER (refer to FIG. 10). A gap defined between portions of the right rear connector 823Ab that is divided by the right rear slit 823Ag can be varied according to the outside diameter of the right rear outer tube 822*a*, and the portions are fastened together by a fastening member 823Ae. Namely, the right rear connector 823Ab uses a so-called split fastening structure.

According to this configuration, stress exerted on the right front outer tube 821*a* as a result of being held by the right front connector 823Aa is easily dispersed. Likewise, stress exerted on the right rear outer tube 822*a* as a result of being held by the right rear connector 823Ab is easily dispersed. Further, it is possible to reduce the number of parts to obtain these advantageous effects.

As a result, it is possible to further improve the maintainability of the desired driving performance at low costs while preventing the enlargement in size of the vehicle 1 that includes the leanable body frame 21 and the two front wheels 3.

As shown in FIGS. 12, 13A and 13B, the left front slit 723Af and the left rear slit 723Ag extend parallel to each other. Likewise, the right front slit 823Af and the right rear slit 823Ag extend parallel to each other.

According to this configuration, the left front slit 723Af and the left rear slit 723Ag are able to be easily machined in the left upper connector 723A. Likewise, the right front slit 823Af and the right rear slit 823Ag are able to be easily machined in the right upper connector 823A.

As a result, it is possible to realize an improvement in maintainability of the desired driving performance at low costs while preventing the enlargement in size of the vehicle 1 that includes the leanable body frame 21 and the two front wheels 3.

As shown in FIG. 13A, the left front slit 723Af and the left rear slit 723Ag extend in the front-rear direction of the body frame 21.

Likewise, the right front slit 823Af and the right rear slit 823Ag extend in the front-rear direction of the body frame 21.

According to this configuration, the fastening member 723Rd that fastens the left front outer tube 721*a* is disposed directly ahead of the left front outer tube 721*a* in the front-rear direction of the body frame 21. Likewise, the fastening member 723Ae that fastens the left rear outer tube 722*a* is disposed directly behind the left rear outer tube 722*a* in the front-rear direction of the body frame 21. Consequently, it is possible to prevent the enlargement in size of the left shock absorber 72 in the left-right direction of the body frame 21.

Likewise, the fastening member 823Rd that fastens the right front outer tube 821*a* is disposed directly ahead of the right front outer tube 821*a* in the front-rear direction of the body frame 21. Likewise, the fastening member 823Ae that fastens the right rear outer tube 822*a* is disposed directly behind the right rear outer tube 822*a* in the front-rear direction of the body frame 21. Consequently, it is possible to prevent the enlargement in size of the right shock absorber 82 in the left-right direction of the body frame 21.

As a result, it is possible to improve the maintainability of the desired driving performance while preventing the enlargement in size of the vehicle 1 that includes the leanable body frame 21 and the two front wheels 3.

As shown in FIG. 13A, the left front slit 723Af and the left rear slit 723Ag includes portions where they overlap as viewed in the front-rear direction of the body frame 21.

Likewise, the right front slit 823Af and the right rear slit 823Ag include portions where they overlap as viewed in the front-rear direction of the body frame 21.

According to this configuration, the left front slit 723Af and the left rear slit 723Ag are able to be easily machined in the left upper connector 723A. Likewise, the right front slit 823Af and the right rear slit 823Ag are able to be easily machined in the right upper connector 823A.

As a result, it is possible to maintain the desired driving performance at low costs while preventing the enlargement in size of the vehicle 1 that includes the leanable body frame 21 and the two front wheels 3.

The preferred embodiments that have been described above are intended to facilitate the understanding of the present invention and is not intended to limit the present invention. Preferred embodiments of the present invention can be modified without departing from the scope thereof and that their equivalents can also be included in the present invention.

In the example shown in FIGS. 12, 13A and 13B, the left front slit 723Af and the left rear slit 723Ag extend in the front-rear direction of the body frame 21. Likewise, the right front slit 823Af and the right rear slit 823Ag extend in the front-rear direction of the body frame 21. However, it is possible to use a configuration in which the left front slit 723Af and the left rear slit 723Ag extend in the left-right direction of the body frame 21. Likewise, it is possible to use a configuration in which the right front slit 823Af and the right rear slit 823Ag extend in the left-right direction of the body frame 21.

In the example shown in FIGS. 12, 13A and 13B, the left front slit 723Af and the left rear slit 723Ag include the portions where they overlap as viewed in the front-rear direction of the body frame 21. Likewise, the right front slit 823Af and the right rear slit 823Ag include portions where they overlap as viewed in the front-rear direction of the body frame 21. However, it is possible to use a configuration in which the left front slit 723Af and the left rear slit 723Ag do not overlap as viewed in the front-rear direction of the body frame 21. Likewise, it is possible to use a configuration in which the right front slit 823Af and the right rear slit 823Ag do not overlap as viewed in the front-rear direction of the body frame 21. For example, the left front slit 723Af and the left rear slit 723Ag may be offset in the left-right direction of the body frame 21 while extending in the front-rear direction of the body frame 21. Likewise, the right front slit 823Af and the right rear slit 823Ag may be offset in the left-right direction of the body frame 21 while extending in the front-rear direction of the body frame 21.

Figure 14:
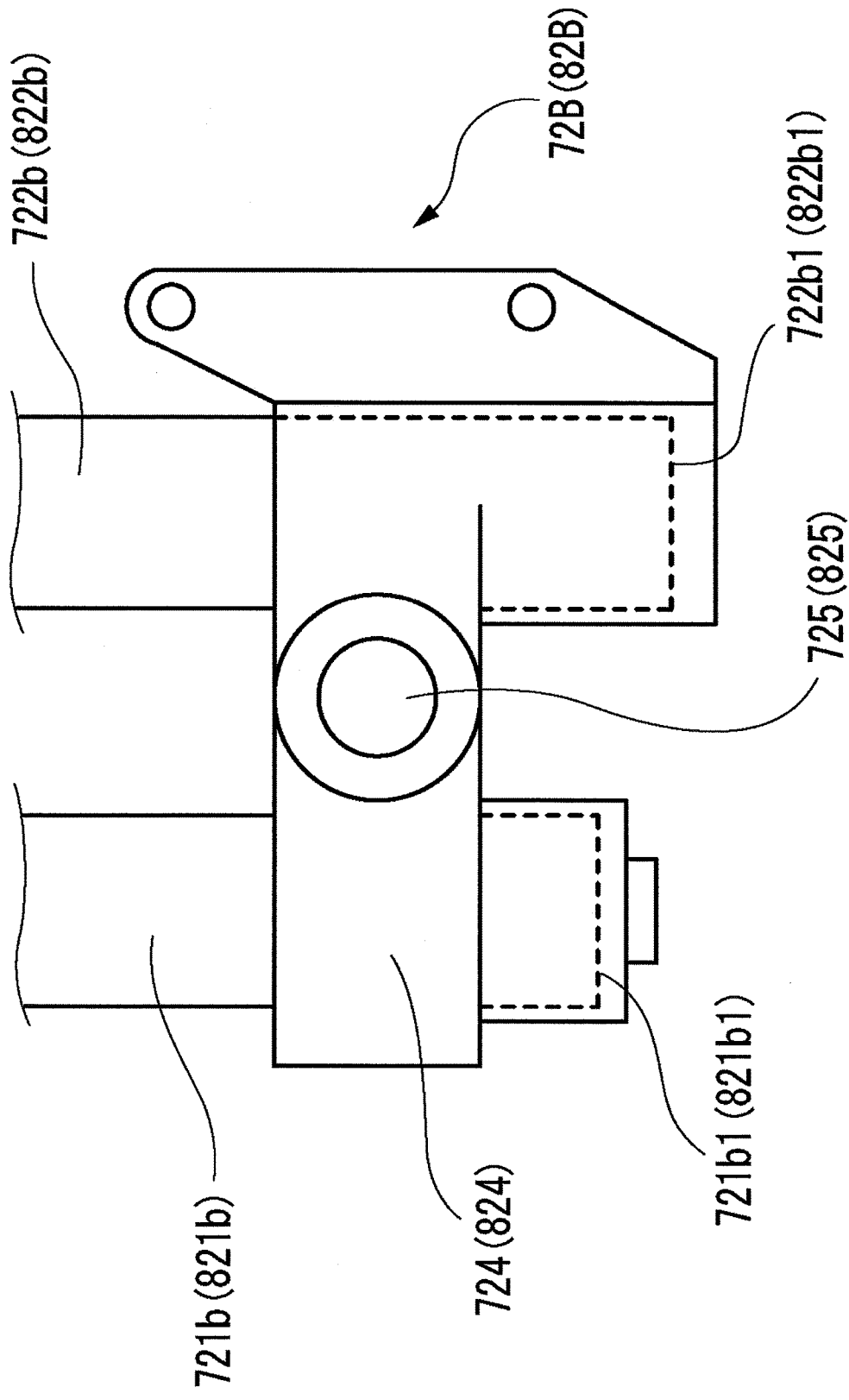
FIG. 14 is a left side view showing a portion of the left suspension according to another modified example.

The positional relationship of the left front inner tube 721*b* and the left rear inner tube 722*b* with the left axle 725 is not limited to the example described by reference to FIG. 8. As in a left shock absorber 72B according to a modified example shown in FIG. 14, the left axle 725 may be disposed above a lower end 721*b*1 of the left front inner tube 721*b* and a lower end 722*b*1 of the left rear inner tube 722*b* and disposed between the left front inner tube 721*b* and the left rear inner tube 722*b*.

By disposing the left axle 725 in the way described above, in such a state that the left shock absorber 72B is compressed to its maximum extent, a lower end 721*a*3 of the left front outer tube 721*a* and a lower end 722*a*3 of the left rear outer tube 722*a* are positioned closer to the left axle 725. Consequently, in the event that the sliding lengths (strokes) of the left front outer tube 721*a* and the left rear outer tube 722*a* are not changed, the left bracket 71 is positioned closer to the road surface, thus making it possible to prevent the enlargement in size of the vehicle 1 in the up-down direction of the body frame 21. On the other hand, in the event that the position of the left bracket 71 is not changed, the sliding lengths (strokes) of the left front outer tube 721*a* and the left rear outer tube 722*a* are extended, thus making it possible to improve the shock attenuating or absorbing performance of the left shock absorber 72B.

The positional relationship of the right front inner tube 821*b* and the right rear inner tube 822*b* with the right axle 825 is not limited to the example described by reference to FIG. 8. As in a right shock absorber 82B according to the modified example shown in FIG. 14, the right axle 825 may be disposed above a lower end 821*b*1 of the right front inner tube 821*b* and a lower end 822*b*1 of the right rear inner tube 822*b* and disposed between the right front inner tube 821*b* and the right rear inner tube 822*b*.

By disposing the right axle 825 in the way described above, in such a state that the right shock absorber 82B is compressed to its maximum extent, a lower end 821*a*3 of the right front outer tube 821*a* and a lower end 822*a*3 of the right rear outer tube 822*a* are positioned closer to the right axle 825. Consequently, in the event that the sliding lengths (strokes) of the right front outer tube 821*a* and the right rear outer tube 822*a* are not changed, the right bracket 81 is positioned closer to the road surface, thus making it possible to prevent the enlargement in size of the vehicle 1 in the up-down direction of the body frame 21. On the other hand, in the event that the position of the right bracket 81 is not changed, the sliding lengths (strokes) of the right front outer tube 821*a* and the right rear outer tube 822*a* are extended, thus making it possible to improve the shock attenuating or absorbing performance of the right shock absorber 82B.

In the preferred embodiments described above, the left rear telescopic element 722 of the left suspension 7 preferably define the left shock absorber, and the left front telescopic element 721, the left upper connector 723 and the left lower connector 724 define a left turn restrictor. However, it is possible to use a configuration in which the left front telescopic element 721 defines the left shock absorber, and the left rear telescopic element 722, the left upper connector 723 and the left lower connector 724 define the left turn restrictor. As this occurs, the conditions relating to the dimensions L1 to L8 that are described by reference to FIGS. 8 and 10 are applied to the left front telescopic element 721.

In the preferred embodiments described above, the right rear telescopic element 822 of the right suspension 8 defines the right shock absorber, and the right front telescopic element 821, the right upper connector 823 and the right lower connector 824 define a right turn restrictor. However, a configuration may be used in which the right front telescopic element 821 defines the right shock absorber, and the right rear telescopic element 822, the right upper connector 823 and the right lower connector 824 define the right turn restrictor. As this occurs, the conditions relating to the dimensions L1 to L8 that are described by reference to FIGS. 8 and 10 are applied to the right front telescopic element 821.

In the preferred embodiments described above, the left upper connector 723 of the left shock absorber 72 includes the left front connector 723*a* and the left rear connector 723*b*, so that the left front outer tube 721*a* and the left rear outer tube 722*a* are connected together as a result of the left front connector 723*a* and the left rear connector 723*b* being fastened together. However, it is possible to use a configuration in which the left front outer tube 721*a* and the left rear outer tube 722*a* are held by two connectors that are arranged side by side in the left-right direction of the body frame 21. Specifically, the two connectors include a left inner connector and a left outer connector. The left inner connector holds an outer circumferential surface that includes a right edge of the left front outer tube 721*a* and an outer circumferential surface that includes a right edge of the left rear outer tube 722*a*. The left outer connector holds an outer circumferential surface that includes a left edge of the left front outer tube 721*a* and an outer circumferential surface that includes a left edge of the left rear outer tube 722*a*.

In the preferred embodiments described above, the right upper connector 823 of the right shock absorber 82 includes the right front connector 823*a* and the right rear connector 823*b*, so that the right front outer tube 821*a* and the right rear outer tube 822*a* are connected together as a result of the right front connector 823*a* and the right rear connector 823*b* being fastened together. However, it is possible to use a configuration in which the right front outer tube 821*a* and the right rear outer tube 822*a* are held by two connectors that are arranged side by side in the left-right direction of the body frame 21. Specifically, the two connectors include a right inner connector and a right outer connector. The right inner connector holds an outer circumferential surface that includes a left edge of the right front outer tube 821*a* and an outer circumferential surface that includes a left edge of the right rear outer tube 822*a*. The right outer connector holds an outer circumferential surface that includes a right edge of the right front outer tube 821*a* and an outer circumferential surface that includes a right edge of the right rear outer tube 822*a*.

In the above preferred embodiments, the vehicle 1 includes a single rear wheel 4. However, the vehicle 1 may include a plurality of rear wheels.

In the above preferred embodiments, the upper cross member 51 is a single plate member, while the lower cross member 52 includes the front element 521 and the rear element 522. However, a configuration may be used in which the upper cross member 51 also includes a front element and a rear element. A configuration may be used in which at least one of the upper cross member 51 and the lower cross member 52 includes a left plate member that is supported on the link support 212 and the left side member 53 and a right plate member that is supported on the link support 212 and the right side member 54.

In the above preferred embodiments, the handlebar 61 includes a single member that extends in the left-right direction of the body frame. However, a configuration may be used in which the handlebar 61 includes a left handlebar to be operated by the left hand of the rider and a right handlebar to be operated by the right hand of the rider that are provided as individual members, as long as steering force to turn the left front wheel 31 and the right front wheel 32 is able to be inputted through the handlebar 61.

In the above preferred embodiments, the steering force transmission 9 includes the intermediate transmission plate 93, the left transmission plate 94, the right transmission plate 95, the intermediate joint 96, the left joint 97, the right joint 98, and the tie-rod 99. However, the intermediate transmission plate 93, the left transmission plate 94, the right transmission plate 95, the intermediate joint 96, the left joint 97, and the right joint 98 may be replaced by appropriate mechanisms such as universal joints as required, as long as the steering force inputted from the handlebar 61 is able to be transmitted to the left suspension 7 and the right suspension 8 by way of the tie-rod 99.

The terms and expressions that are used in this description are used to describe the preferred embodiments of the present invention and hence should not be construed as limiting the scope of the present invention. It should be understood that any equivalents to the characteristic matters that are shown and described in this description should not be excluded and that various modifications made within the scope of claims to be made later are permitted.

When used in this description, the word "parallel" means that two straight lines which do not intersect each other as members while they are inclined at an angle falling within the range of about ±40 degrees are comprised therein. When used in this description to depict directions and members, the expression reading "along a certain direction" means that a case where something inclines at an angle falling within the range of about ±40 degrees relative to the certain direction is comprised therein. When used in this description, the expression reading "something extends in a certain direction" means that a case where something extends while being inclined at an angle falling within the range of about ±40 degrees relative to the certain direction is comprised therein.

When used in this description, the expression "so as not to be movable relative to the body frame 21" means that a certain portion or member is caused to lean in the left-right direction of the vehicle 1 together with the body frame 21 when the body frame 21 is caused to lean in the left-right direction of the vehicle 1. When used in this description, the expression "so as not to be movable relative to the body frame 21" may include not only a case where a certain portion or member is directly fixed to the body frame but also a case where the certain portion of member is fixed to a vehicle component (a fuel tank, a bracket, the power unit 24, etc.) which is fixed on the body frame 21. Here the term "fixed" may include a case that a certain portion or member is fixed by way of a damping member or the like.

The present invention can be implemented with many different embodiments. This description should be understood to provide preferred embodiments of the present invention. The preferred embodiments which are at least described or illustrated in this description is so described or illustrated based on the understanding that the preferred embodiments are not intended to limit the present invention.

The present invention includes every embodiment which includes an equivalent element, a modification, a deletion, a combination (for example, a combination of characteristics of various embodiments), an improvement and an alteration which can be recognized by those skilled in the art to which the present invention pertains based on the embodiment disclosed in this description. The limitative matters of claims should be construed broadly based on terms used in the claims and hence should not be limited by the preferred embodiments described in this specification or the prosecution of this patent application. The preferred embodiments should be construed as non-exclusive. For example, in this description, the terms "preferable" and "may" should be construed as being non-exclusive, and those terms mean, respectively, that it is "preferable but not limited thereto" and that it "may be acceptable but not limited thereto."

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
    a body frame;
    a left front wheel and a right front wheel that are arranged side by side in a left-right direction of the body frame; and
    a linkage disposed above the left front wheel and the right front wheel in an up-down direction of the body frame, and that changes positions of the left front wheel and the right front wheel relative to the body frame to cause the body frame to lean to left or right of the vehicle; wherein
    the linkage includes an upper cross member, a lower cross member, a left side member, and a right side member;
    the upper cross member, the lower cross member, the left side member, and the right side member are connected such that the upper cross member and the lower cross member maintain postures that are parallel to each other, and such that the left side member and the right side member maintain postures that are parallel to each other;

the vehicle further includes:
  a left shock absorber supporting the left front wheel and that attenuates or absorbs displacement of the left front wheel relative to the linkage in the up-down direction of the body frame;
  a right shock absorber supporting the right front wheel and that attenuates or absorbs displacement of the right front wheel relative to the linkage in the up-down direction of the body frame;
  a left bracket turnably connected to the left side member;
  a right bracket turnably connected to the right side member;
  a steering member connected to the body frame so as to be able to turn about a steering axis; and
  a steering force transmission that turns the left bracket and the right bracket in a direction that the steering member is turned;

the left shock absorber includes:
  a left front outer tube supported on the left bracket;
  a left rear outer tube supported on the left bracket at a position directly behind the left front outer tube in a front-rear direction of the body frame;
  a left front inner tube connected to the left front outer tube so as to be slidable in an interior of the left front outer tube along a left telescopic axis;
  a left rear inner tube connected to the left rear outer tube at a position directly behind the left front inner tube so as to be slidable in an interior of the left rear outer tube along the left telescopic axis;
  a lower left connector connecting the left front inner tube and the left rear inner tube;
  a left axle including a first end supported by the lower left connector, and a second end supporting the left front wheel; and
  an upper left connector connecting the left front outer tube and the left rear outer tube;

the right shock absorber includes:
  a right front outer tube supported on the right bracket;
  a right rear outer tube supported on the right bracket at a position directly behind the right front outer tube in the front-rear direction of the body frame;
  a right front inner tube connected to the right front outer tube so as to be slidable in an interior of the right front outer tube along a right telescopic axis;
  a right rear inner tube connected to the right rear outer tube at a position directly behind the right front inner tube so as to be slidable in an interior of the right rear outer tube along the right telescopic axis;
  a lower right connector connecting the right front inner tube and the right rear inner tube;
  a right axle including a first end supported by the lower right connector, and a second end supporting the right front wheel; and
  an upper right connector connecting the right front outer tube and the right rear outer tube;

the left front outer tube is located above the left front inner tube along the left telescopic axis;
the left rear outer tube is located above the left rear inner tube along the left telescopic axis;
the right front outer tube is located above the right front inner tube along the right telescopic axis; and
the right rear outer tube is located above the right rear inner tube along the right telescopic axis.

2. The vehicle according to claim 1, wherein
the left bracket supports a left front upper end of the left front outer tube and a left rear upper end of the left rear outer tube;
the upper left connector connects a portion that is located closer to a left front lower end of the left front outer tube than to a midpoint located halfway between a left front upper end and the left front lower end of the left front outer tube with a portion that is located closer to a left rear lower end of the left rear outer tube than to a midpoint located halfway between a left rear upper end and the left rear lower end of the left rear outer tube;
the right bracket supports a right front upper end of the right front outer tube and a right rear upper end of the right rear outer tube; and
the upper right connector connects a portion that is located closer to a right front lower end of the right front outer tube than to a midpoint located halfway between a right front upper end and the right front lower end of the right front outer tube with a portion that is located closer to a right rear lower end of the right rear outer tube than to a midpoint located halfway between a right rear upper end and the right rear lower end of the right rear outer tube.

3. The vehicle according to claim 1, wherein
the left bracket supports a left front upper end of the left front outer tube and a left rear upper end of the left rear outer tube;
the upper left connector overlaps the left front wheel as viewed from the left-right direction of the body frame at least when a lower end of the left rear outer tube most closely approaches the left axle;
the right bracket supports a right front upper end of the right front outer tube and a right rear upper end of the right rear outer tube; and
the upper right connector overlaps the right front wheel as viewed from the left-right direction of the body frame at least when a lower end of the right rear outer tube most closely approaches the right axle.

4. The vehicle according to claim 3, wherein, when the body frame is in an upright state while the left front wheel and the right front wheel are not turned by the steering member, the upper left connector overlaps the left front wheel as viewed from the left-right direction of the body frame, and the upper right connector overlaps the right front wheel as viewed from the left-right direction of the body frame.

5. A vehicle comprising:
a body frame;
a left front wheel and a right front wheel that are arranged side by side in a left-right direction of the body frame; and
a linkage disposed above the left front wheel and the right front wheel in an up-down direction of the body frame, and that changes positions of the left front wheel and the right front wheel relative to the body frame to cause the body frame to lean to left or right of the vehicle; wherein
the linkage includes an upper cross member, a lower cross member, a left side member, and a right side member;
the upper cross member, the lower cross member, the left side member, and the right side member are connected such that the upper cross member and the lower cross member maintain postures that are parallel to each other, and such that the left side member and the right side member maintain postures that are parallel to each other;

the vehicle further includes:
- a left shock absorber supporting the left front wheel and that attenuates or absorbs displacement of the left front wheel relative to the linkage in the up-down direction of the body frame;
- a right shock absorber supporting the right front wheel and that attenuates or absorbs displacement of the right front wheel relative to the linkage in the up-down direction of the body frame;
- a left bracket turnably connected to the left side member;
- a right bracket turnably connected to the right side member;
- a steering member connected to the body frame so as to be able to turn about a steering axis; and
- a steering force transmission that turns the left bracket and the right bracket in a direction that the steering member is turned;

the left shock absorber includes:
- a left front outer tube supported on the left bracket;
- a left rear outer tube supported on the left bracket at a position directly behind the left front outer tube in a front-rear direction of the body frame;
- a left front inner tube connected to the left front outer tube so as to be slidable in an interior of the left front outer tube along a left telescopic axis;
- a left rear inner tube connected to the left rear outer tube at a position directly behind the left front inner tube so as to be slidable in an interior of the left rear outer tube along the left telescopic axis;
- a left axle including a first end supported by the left front inner tube and the left rear inner tube, and a second end supporting the left front wheel; and
- a left connector connecting the left front outer tube and the left rear outer tube;

the right shock absorber includes:
- a right front outer tube supported on the right bracket;
- a right rear outer tube supported on the right bracket at a position directly behind the right front outer tube in the front-rear direction of the body frame;
- a right front inner tube connected to the right front outer tube so as to be slidable in an interior of the right front outer tube along a right telescopic axis;
- a right rear inner tube connected to the right rear outer tube at a position directly behind the right front inner tube so as to be slidable in an interior of the right rear outer tube along the right telescopic axis;
- a right axle including a first end supported by the right front inner tube and the right rear inner tube, and a second end supporting the right front wheel; and
- a right connector connecting the right front outer tube and the right rear outer tube;

when the body frame is in an upright state while the left front wheel and the right front wheel are not turned by the steering member, a dimension along the left telescopic axis of a portion of the left rear outer tube that is located above the left front wheel as viewed from the left-right direction of the body frame is greater than a dimension along the left telescopic axis of a portion of the left rear outer tube that overlaps the left front wheel as viewed from the left-right direction of the body frame;

an upper end of the left rear inner tube is positioned above the left connector in the up-down direction of the body frame;

when the body frame is in the upright state while the left front wheel and the right front wheel are not turned by the steering member, a dimension along the right telescopic axis of a portion of the right rear outer tube that is located above the right front wheel as viewed from the left-right direction of the body frame is greater than a dimension along the right telescopic axis of a portion of the right rear outer tube that overlaps the right front wheel as viewed from the left-right direction of the body frame; and an upper end of the right rear inner tube is positioned above the right connector in the up-down direction of the body frame.

6. A vehicle comprising:
- a body frame;
- a left front wheel and a right front wheel that are arranged side by side in a left-right direction of the body frame; and
- a linkage disposed above the left front wheel and the right front wheel in an up-down direction of the body frame, and that changes positions of the left front wheel and the right front wheel relative to the body frame to cause the body frame to lean to left or right of the vehicle; wherein the linkage includes an upper cross member, a lower cross member, a left side member, and a right side member;

the upper cross member, the lower cross member, the left side member, and the right side member are connected such that the upper cross member and the lower cross member maintain postures that are parallel to each other, and such that the left side member and the right side member maintain postures that are parallel to each other;

the vehicle further includes:
- a left shock absorber supporting the left front wheel and that attenuates or absorbs displacement of the left front wheel relative to the linkage in the up-down direction of the body frame;
- a right shock absorber supporting the right front wheel and that attenuates or absorbs displacement of the right front wheel relative to the linkage in the up-down direction of the body frame;
- a left bracket turnably connected to the left side member;
- a right bracket turnably connected to the right side member;
- a steering member connected to the body frame so as to be able to turn about a steering axis; and
- a steering force transmission that turns the left bracket and the right bracket in a direction that the steering member is turned;

the left shock absorber includes:
- a left front outer tube supported on the left bracket;
- a left rear outer tube supported on the left bracket at a position directly behind the left front outer tube in a front-rear direction of the body frame;
- a left front inner tube connected to the left front outer tube so as to be slidable in an interior of the left front outer tube along a left telescopic axis;
- a left rear inner tube connected to the left rear outer tube at a position directly behind the left front inner tube so as to be slidable in an interior of the left rear outer tube along the left telescopic axis;

a left axle including a first end supported by the left front inner tube and the left rear inner tube, and a second end supporting the left front wheel; and
a left connector connecting the left front outer tube and the left rear outer tube;
the right shock absorber includes:
a right front outer tube supported on the right bracket;
a right rear outer tube supported on the right bracket at a position directly behind the right front outer tube in the front-rear direction of the body frame;
a right front inner tube connected to the right front outer tube so as to be slidable in an interior of the right front outer tube along a right telescopic axis;
a right rear inner tube connected to the right rear outer tube at a position directly behind the right front inner tube so as to be slidable in an interior of the right rear outer tube along the right telescopic axis;
a right axle including a first end supported by the right front inner tube and the right rear inner tube, and a second end supporting the right front wheel; and
a right connector connecting the right front outer tube and the right rear outer tube;
the left connector holds an outer circumferential surface of the left rear outer tube;
a dimension along the left telescopic axis of a portion of the left rear outer tube that is held by the left connector is smaller than a dimension along the left telescopic axis of a portion of the left rear outer tube that is supported by the left bracket;
the right connector holds an outer circumferential surface of the right rear outer tube; and
a dimension along the right telescopic axis of a portion of the right rear outer tube that is held by the right connector is smaller than a dimension along the right telescopic axis of a portion of the right rear outer tube that is supported by the right bracket.

7. A vehicle comprising:
a body frame;
a left front wheel and a right front wheel that are arranged side by side in a left-right direction of the body frame; and
a linkage disposed above the left front wheel and the right front wheel in an up-down direction of the body frame, and that changes positions of the left front wheel and the right front wheel relative to the body frame to cause the body frame to lean to left or right of the vehicle; wherein
the linkage includes an upper cross member, a lower cross member, a left side member, and a right side member;
the upper cross member, the lower cross member, the left side member, and the right side member are connected such that the upper cross member and the lower cross member maintain postures that are parallel to each other, and such that the left side member and the right side member maintain postures that are parallel to each other;
the vehicle further includes:
a left shock absorber supporting the left front wheel and that attenuates or absorbs displacement of the left front wheel relative to the linkage in the up-down direction of the body frame;
a right shock absorber supporting the right front wheel and that attenuates or absorbs displacement of the right front wheel relative to the linkage in the up-down direction of the body frame;
a left bracket turnably connected to the left side member;
a right bracket turnably connected to the right side member;
a steering member connected to the body frame so as to be able to turn about a steering axis; and
a steering force transmission that turns the left bracket and the right bracket in a direction that the steering member is turned;
the left shock absorber includes:
a left front outer tube supported on the left bracket;
a left rear outer tube supported on the left bracket at a position directly behind the left front outer tube in a front-rear direction of the body frame;
a left front inner tube connected to the left front outer tube so as to be slidable in an interior of the left front outer tube along a left telescopic axis;
a left rear inner tube connected to the left rear outer tube at a position directly behind the left front inner tube so as to be slidable in an interior of the left rear outer tube along the left telescopic axis;
a left axle including a first end supported by the left front inner tube and the left rear inner tube, and a second end supporting the left front wheel; and
a left connector connecting the left front outer tube and the left rear outer tube:
the right shock absorber includes:
a right front outer tube supported on the right bracket;
a right rear outer tube supported on the right bracket at a position directly behind the right front outer tube in the front-rear direction of the body frame;
a right front inner tube connected to the right front outer tube so as to be slidable in an interior of the right front outer tube along a right telescopic axis;
a right rear inner tube connected to the right rear outer tube at a position directly behind the right front inner tube so as to be slidable in an interior of the right rear outer tube along the right telescopic axis;
a right axle including a first end supported by the right front inner tube and the right rear inner tube, and a second end supporting the right front wheel; and
a right connector connecting the right front outer tube and the right rear outer tube;
the left front outer tube is located above the left front inner tube along the left telescopic axis;
the left rear outer tube is located above the left rear inner tube along the left telescopic axis;
the right front outer tube is located above the right front inner tube along the right telescopic axis;
the right rear outer tube is located above the right rear inner tube along the right telescopic axis;
the left connector includes a left front connector holding the left front outer tube, and a left rear connector holding the left rear outer tube;
the left front connector includes a left front slit extending along the left telescopic axis;
the left rear connector includes a left rear slit extending along the left telescopic axis;
the right connector includes a right front connector holding the right front outer tube, and a right rear connector holding the right rear outer tube;
the right front connector includes a right front slit extending along the right telescopic axis; and
the right rear connector includes a right rear slit extending along the right telescopic axis.

8. The vehicle according to claim 7, wherein the left front slit and the left rear slit extend parallel to each other, and the right front slit and the right rear slit extend parallel to each other.

9. The vehicle according to claim 7, wherein the left front slit and the left rear slit extend in the front-rear direction of the body frame, and the right front slit and the right rear slit extend in the front-rear direction of the body frame.

10. The vehicle according to claim 9, wherein the left front slit at least partially overlaps the left rear slit as viewed from the front-rear direction of the body frame, and the right front slit at least partially overlaps the right rear slit as viewed from the front-rear direction of the body frame.

11. A vehicle comprising:
a body frame;
a left front wheel and a right front wheel that are arranged side by side in a left-right direction of the body frame; and
a linkage disposed above the left front wheel and the right front wheel in an up-down direction of the body frame, and that changes positions of the left front wheel and the right front wheel relative to the body frame to cause the body frame to lean to left or right of the vehicle; wherein
the linkage includes an upper cross member, a lower cross member, a left side member, and a right side member;
the upper cross member, the lower cross member, the left side member, and the right side member are connected such that the upper cross member and the lower cross member maintain postures that are parallel to each other, and such that the left side member and the right side member maintain postures that are parallel to each other;
the vehicle further includes:
  a left shock absorber supporting the left front wheel and that attenuates or absorbs displacement of the left front wheel relative to the linkage in the up-down direction of the body frame;
  a right shock absorber supporting the right front wheel and that attenuates or absorbs displacement of the right front wheel relative to the linkage in the up-down direction of the body frame;
  a left bracket turnably connected to the left side member;
  a right bracket turnably connected to the right side member;
  a steering member connected to the body frame so as to be able to turn about a steering axis; and
  a steering force transmission that turns the left bracket and the right bracket in a direction that the steering member is turned;
the left shock absorber includes:
  a left front outer tube supported on the left bracket;
  a left rear outer tube supported on the left bracket at a position directly behind the left front outer tube in a front-rear direction of the body frame;
  a left front inner tube connected to the left front outer tube so as to be slidable in an interior of the left front outer tube along a left telescopic axis;
  a left rear inner tube connected to the left rear outer tube at a position directly behind the left front inner tube so as to be slidable in an interior of the left rear outer tube along the left telescopic axis;
  a left axle including a first end supported by the left front inner tube and the left rear inner tube, and a second end supporting the left front wheel; and
  a left connector connecting the left front outer tube and the left rear outer tube;
the right shock absorber includes:
  a right front outer tube supported on the right bracket;
  a right rear outer tube supported on the right bracket at a position directly behind the right front outer tube in the front-rear direction of the body frame;
  a right front inner tube connected to the right front outer tube so as to be slidable in an interior of the right front outer tube along a right telescopic axis;
  a right rear inner tube connected to the right rear outer tube at a position directly behind the right front inner tube so as to be slidable in an interior of the right rear outer tube along the right telescopic axis;
  a right axle including a first end supported by the right front inner tube and the right rear inner tube, and a second end supporting the right front wheel; and
  a right connector connecting the right front outer tube and the right rear outer tube;
the left front outer tube is located above the left front inner tube along the left telescopic axis;
the left rear outer tube is located above the left rear inner tube along the left telescopic axis;
the right front outer tube is located above the right front inner tube along the right telescopic axis;
the right rear outer tube is located above the right rear inner tube along the right telescopic axis;
the left axle is disposed above a lower end of the left front inner tube and a lower end of the left rear inner tube, and is disposed between the left front inner tube and the left rear inner tube; and
the right axle is disposed above a lower end of the right front inner tube and a lower end of the right rear inner tube, and is disposed between the right front inner tube and the right rear inner tube.

* * * * *